(12) United States Patent
Carr et al.

(10) Patent No.: US 8,217,934 B2
(45) Date of Patent: Jul. 10, 2012

(54) SYSTEM AND METHODS FOR RENDERING TRANSPARENT SURFACES IN HIGH DEPTH COMPLEXITY SCENES USING HYBRID AND COHERENT LAYER PEELING

(75) Inventors: Nathan A. Carr, San Jose, CA (US); Gavin S. P. Miller, Los Altos, CA (US); Radomir Mech, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1022 days.

(21) Appl. No.: 12/177,709

(22) Filed: Jul. 22, 2008

(65) Prior Publication Data

US 2009/0184960 A1 Jul. 23, 2009

Related U.S. Application Data

(60) Provisional application No. 61/022,897, filed on Jan. 23, 2008.

(51) Int. Cl.
*G06T 15/40* (2011.01)
(52) U.S. Cl. .................................................. 345/422
(58) Field of Classification Search .................. 345/422
See application file for complete search history.

(56) References Cited

U.S. PATENT DOCUMENTS

| | | | | |
|---|---|---|---|---|
| 6,670,955 B1 * | 12/2003 | Morein | ......................... | 345/421 |
| 6,744,433 B1 * | 6/2004 | Bastos et al. | ................... | 345/422 |
| 6,989,840 B1 * | 1/2006 | Everitt et al. | ................... | 345/592 |
| 7,098,922 B1 * | 8/2006 | Bastos et al. | ................... | 345/506 |
| 7,505,036 B1 * | 3/2009 | Baldwin | ......................... | 345/421 |
| 2007/0103462 A1 * | 5/2007 | Miller | ............................. | 345/421 |

OTHER PUBLICATIONS

Aila, T., Miettinen, V., and Nordlund, P. 2003. Delay streams for graphics hardware. In SIGGRAPH '03: ACM SIGGRAPH 2003 Papers, ACM, New York, NY, USA, 792-800, Aug. 2003.

(Continued)

*Primary Examiner* — Edward Martello
(74) *Attorney, Agent, or Firm* — Robert C. Kowert; Meyertons, Hood, Kivlin, Kowert & Goetzel, P.C.

(57) ABSTRACT

Systems, methods, and computer-readable storage media for rendering three-dimensional scenes including transparent surfaces are described, including two techniques for efficient rendering of transparent surfaces that exploit partial ordering in the scene geometry. The first (hybrid layer peeling) may combine unordered meshes with ordered meshes in an efficient way, and may be well suited for rendering scenes such as volumes with embedded transparent meshes. The second (coherent layer peeling) may efficiently detect and render correctly sorted fragment sequences for a given pixel in one iteration, allowing for a smaller number of passes than traditional depth peeling. Pre-sorting and/or periodic sorting of some or all of the surfaces in a scene may be performed, but perfect sorting may not be required. The methods may be implemented in hardware, software, or a combination thereof, such as by program instructions executable on one or more CPUs and/or GPUs.

40 Claims, 10 Drawing Sheets

OTHER PUBLICATIONS

Bavoil, L., Callahan, S. P., Lefohn, A., Jo A. L. D. C., and Silva, C. T. 2007. Multi-fragment effects on the gpu using the k-buffer. In I3D '07: Proceedings of the 2007 symposium on Interactive 3D graphics and games, ACM, New York, NY, USA, 97-104, Apr. 30-May 2, 2007.

Govindaraju, N. K., Henson, M., Lin, M. C., and Manocha, D. 2005. Interactive visibility ordering and transparency computations among geometric primitives in complex environments. In I3D '05: Proceedings of the 2005 symposium on Interactive 3D graphics and games, ACM, New York, NY, USA, 49-56, Apr. 2005.

Mammen, A. Jul. 1989. Transparency and antialiasing algorithms implemented with the virtual pixel maps technique. IEEE Comput. Graph. Appl. 9,4,43-55.

Mark, W. R., and Proudfoot, K. 2001. The f-buffer: A rasterization-order fifo buffer for multi-pass rendering. In Eurographics Workshop on Graphics Hardware. Aug. 2001, all pages.

Mike Houston, Arcot Preetham, M. S. 2005. A hardware f-buffer implementation. Tech. Rep. CSTR 2005-05, CS Dept., Stanford U., May 2005.

Wexler, D., Gritz, L., Enderton, E., and Rice, J. Jul. 2005. Gpu-accelerated high-quality hidden surface removal. In HWWS '05: Proceedings of the ACM SIGGRAPH/EUROGRAPHICS conference on Graphics hardware, ACM, New York, NY, USA, 7-14.

\* cited by examiner

SYSTEM AND METHODS FOR RENDERING TRANSPARENT SURFACES IN HIGH DEPTH COMPLEXITY SCENES USING HYBRID AND COHERENT LAYER PEELING

PRIORITY INFORMATION

This application claims benefit of priority to U.S. Provisional Application No. 61/022,897, filed Jan. 23, 2008, which is herein incorporated by reference in its entirety.

BACKGROUND

Description of the Related Art

Efficient rendering of transparent surfaces has long been a problem in computer graphics. When rendering a scene in 3D that includes semi-transparent surfaces, the classic way that graphics hardware works is a rasterization scheme, where every triangle is drawn projected onto the camera plane and drawn in turn to the screen. In these systems, a structure known as the z-buffer keeps track of, for every pixel on the screen, the surface closest to the camera at that pixel. If all the triangles are opaque, the z-buffer will solve the occlusion problem by only replacing pixels when a new triangle that is being drawn or (or a portion of a new triangle that is being drawn) is closer to the viewer. When rendering opaque geometry, each triangle is rasterized or converted into pixel colors and depths in turn and the z-buffer test ensures that the nearest surface color is displayed at each pixel. Therefore, triangles that are occluded or hidden by other triangles will not be visible, and only those surfaces that should be visible appear on the screen. For z-buffered opaque geometry, the triangles do not need to be sorted in depth. However, for scenes that include semi-transparent surfaces, z-buffering cannot be used directly, because ordering does matter. Triangles cannot be submitted in any arbitrary order.

Many years ago, a simple solution for such rendering was developed, a technique known as the "painter's algorithm." The painter's algorithm starts by sorting the geometry (e.g., triangles and/or objects) in a scene in a back-to-front manner as viewed from the camera. The surfaces furthest away from the camera are drawn first and each successive transparent layer is rendered over the top, in much the same way that a painter goes about forming a painting. Using this method, the scene is slowly built up layer by layer until the scene is complete. Using blending modes, transparent effects can be correctly depicted. Two primary drawbacks exist with this approach. Firstly, the surfaces must be sorted into occlusion order, and secondly, individual triangles or other geometric primitives must be split at intersections or when visibility cycles arise during sorting. The latter of the two drawbacks can make this process particularly expensive. The painter's algorithm can be classified as an object level approach to the rendering of transparent surfaces, since it works by sorting high-level primitives such as triangles.

An alternative class of algorithms works at the pixel level. These algorithms work by sorting surfaces viewed through each pixel center. One of these pixel level techniques is known as depth peeling. Depth peeling works by rendering geometry multiple times to accumulate a final result. Each iteration of rendering peels off a single surface depth layer visible through each pixel. The core algorithm has an advantage over the painter's algorithm in that it does not require geometric primitives to be sorted up front. Furthermore, geometric splitting is not needed as in the case of object level transparency techniques. Depth peeling, however, requires as many iterations as the transparent depth complexity of the worst (i.e., most complex) pixels. For example, given n transparent surfaces viewed through a pixel, the worst case algorithmic complexity of depth peeling is $O(n^2)$, since n peels are required and all n surfaces are rendered for each peel.

As the power and complexity of personal computer systems increase, graphics operations, such as those required for z-buffering, depth peeling, rasterization, etc., are increasingly being performed using dedicated graphics rendering devices referred to as graphics processing units (GPUs). As used herein, the terms "graphics processing unit" and "graphics processor" are used interchangeably. GPUs are often used in removable graphics cards that are coupled to a motherboard via a standardized bus (e.g., AGP or PCI Express). GPUs may also be used in game consoles and in integrated graphics solutions (e.g., for use in some portable computers and lower-cost desktop computers). Although GPUs vary in their capabilities, they may typically be used to perform such tasks as rendering of two-dimensional (2D) graphical data, rendering of three-dimensional (3D) graphical data, accelerated rendering of graphical user interface (GUI) display elements, and digital video playback. A GPU may implement one or more application programmer interfaces (APIs) that permit programmers to invoke the functionality of the GPU.

A GPU may include various built-in and configurable structures for rendering digital images to an imaging device. Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values.

Vector graphics data may be stored and manipulated as one or more geometric objects built with geometric primitives. The geometric primitives (e.g., points, lines, polygons, curves, and text characters) may be based upon mathematical equations to represent parts of vector graphics data in digital images. The geometric objects may typically be located in two-dimensional or three-dimensional space. To render vector graphics on raster-based imaging devices (e.g., most display devices and printers), the geometric objects are typically converted to raster graphics data in a process called rasterization.

Graphical data may often be expressed in a structured format that complies with a particular specification or model for representing such data. Instead of requiring application programs to describe every page as a full-resolution pixel array, a high-level imaging model may enable applications to describe the appearance of pages containing text, graphical shapes, and sampled images in terms of abstract graphical elements rather than directly in terms of device pixels. Such specifications and models may often be implemented across multiple computing platforms to facilitate the exchange of graphical data. The Adobe® PostScript® language, Adobe® Portable Document Format, and Adobe® Imaging Model, for example, include various structures and commands to describe complex two-dimensional graphical data including geometric models and bitmapped images.

SUMMARY

Various embodiments of systems, methods, and computer-readable storage media for rendering transparent surfaces in complex three-dimensional scenes are disclosed. In some embodiments, the methods may detect that at least some of the surfaces are in correct depth order (i.e., correct occlusion order) and may exploit this situation to improve performance. For example, the method may include performing depth peeling only on surfaces in a range of depth layers that are not already in order. Spans of surfaces that are found to be in correct depth order may be processed using another technique, such as a reverse painter's algorithm, to composite them into the final image in single pass. The use of this technique may significantly improve the performance of rendering such images in various graphics applications over traditional depth peeling techniques, because depth peeling may not need to be applied at every pixel and for every depth layer.

The methods described herein for rendering scenes with order independent transparency may include some of the best features of both object-based and pixel-based approaches. Two pixel level techniques for transparent surface rendering are disclosed, along with several alternate variations. Both techniques are enhancements of traditional depth peeling that exploit ordered structure in the geometry. One technique may be particularly well suited for combining unsorted meshes with sorted meshes. The second technique exploits correctly sorted sequences of layers at a given pixel for a mostly (or at least partially) sorted collection of meshes. The combined approach of approximate model-space sorting with enhanced peeling logic per pass may enable dramatic performance improvements for correctly rendering high depth complexity scenes. In various embodiments, the techniques may be efficiently implemented on currently available CPUs and/or graphics processing units (GPUs). In other embodiments, the techniques may be well suited to take advantage of minimal changes to hardware features, such as may be provided on future generation GPUs.

As noted above, in some embodiments, the methods described herein may include an enhanced approach to standard depth peeling that may execute more efficiently when surfaces are at least partially sorted. The methods may not require costly clipping or perfect sorting, but the performance of the methods may depend on the degree to which the data is sorted. For example, in some embodiments, if the data is perfectly sorted, the approach may render a correct result in a single iteration. On the other hand, when the data is sorted in reverse order, the approach may mimic that of depth peeling but may exhibit a slightly higher cost per iteration.

The techniques described herein may in various embodiments be implemented using hardware, software, or a combination thereof. For example, in some embodiments, program instructions executable on one or more processors (e.g., CPUs or GPUs) to implement the methods may be may be encoded and stored on a computer-readable storage medium. In other embodiments, such program instructions may be stored in a memory of a computer system that includes one or more processors configured to access the instruction and to execute them in order to implement the methods.

Figure 1:
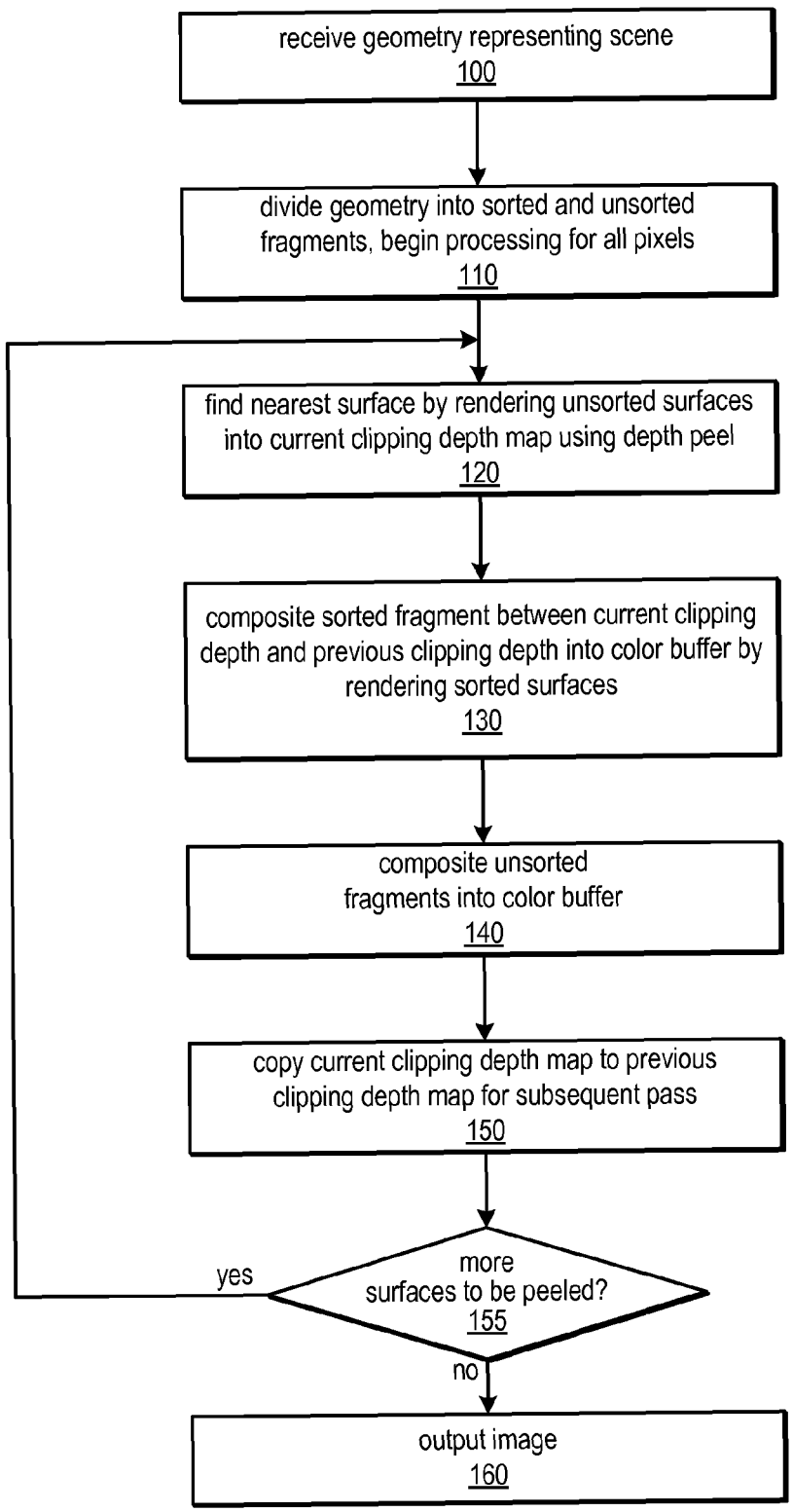
FIG. 1 is a flow diagram illustrating a method for performing hybrid layer peeling, according to one embodiment.

Specific embodiments are shown by way of example in the drawings and are herein described in detail. It should be understood, however, that drawings and detailed description thereto are not intended to limit embodiments to the particular forms disclosed, but on the contrary, the intention is to cover all modifications, equivalents and alternatives falling within the spirit and scope as defined by the appended claims. For example, while many of the algorithms presented are described as compositing images in a front-to-back manner, in other embodiments, the techniques may be applied to a layer peeling mechanism in which the compositing is performed in a back-to-front manner. The use of a back-to-front compositing scheme may in some embodiments allow for a different set of blending modes to be supported.

DETAILED DESCRIPTION OF EMBODIMENTS

Rendering correct transparency in 3D scenes with high complexity at interactive rates can be challenging. Using embodiments of the systems and methods described herein, scenes including order independent transparency may be rendered efficiently on legacy hardware and/or using a graphics processing unit (GPU). In traditional object-based methods, such as the painter's algorithm, surfaces are typically sorted and drawn in a back-to-front or front-to-back manner. This sorting may be computationally costly because it may have to be done each time the camera position or the scene changes, and it may require clipping when surfaces inter-penetrate or cyclically overlap.

The painter's algorithm may not be well suited, for example, for working on triangles that intersect one another in space. For example, a scene may include two triangles at 45 degree angles that cut into each other. There is no way to order these triangles if they are both transparent (e.g., one is in front of the other part of the time and vice versa). To make the painter's algorithm work correctly in that case, the triangles must be chopped up into sub-triangles along the intersections. When the geometry is diced up along all such intersection lines, more triangles are made, and the algorithm can sort those sub-triangles into occlusion compatible order. This method can be very expensive, especially if there are millions of triangles in the scene. It can be very computationally-intensive to figure out which triangles intersect in space and which ones overlap.

Another case for which the painter's algorithm may not be well suited is when surfaces cyclically overlap. For example, multiple triangles can be arranged in a way that they cyclically overlap one another in depth so that every triangle is in front of every other triangle in a continuous loop. This would be similar to fanning out a deck of cards and having it circle back on itself. In this case, even though the triangles may not cut into each other in space, there is no way to order them appropriately.

An algorithm called depth peeling was developed to try to address this problem. This algorithm works at the pixel level, similar to the algorithm described above involving the z-buffer. This algorithm attempts to build up the correct ordering of surfaces through each pixel. For the purposes of this algorithm, compositing is done front-to-back (unlike the painter's algorithm, which operated back-to-front). For this algorithm, blending algorithm(s) can be modified to do blending using front-to-back ordering instead, as on a computer they generally work equally well in either direction. Because the algorithm works on the pixel level, it does not require sorting of the geometry. It orders things correctly and does correct compositing through every pixel (ordering on the per-pixel level). Note that pixel-based methods, such as depth peeling, typically require as many passes through the data as the largest number of surfaces covering any given pixel on the screen, but in such methods clipping may not be required.

Traditional depth peeling may be described as follows. If a scene is being rendered using the z-buffer, after the scene has been rendered once, the observation is that the depth of the very first set of surfaces that are visible as seen by the viewer are now available. In other words, for each pixel, what the z-buffer holds after entering the scene the first time is the depth value of the first surface through that pixel in the screen. That is the first depth layer. The scene may be rendered again, if you have that first depth layer, excluding the surfaces that are at that first depth layer (after "peeling" them away). After that second pass rendering the geometry, the z-buffer stores the next set of visible surfaces. For example, when rendering a sphere, the first depth layer that would be seen would be the front half of the sphere, as it sticks out toward the camera or viewer. On the next pass, after peeling away the first depth layer, the camera or viewer would see the portion of the sphere that points away from them (i.e., the back half). This algorithm works well and can handle triangles that intersect and overlap. Through each pixel, one depth layer would be peeled off at a time in turn to render the scene. Each time a depth layer is peeled away, if the transparent value for that layer is known, compositing may begin, in a front-to-back manner, addressing the transparency in the scene layer by layer, one at a time. As noted above, this algorithm requires as many passes through the geometry as there are depth layers. For example, a sphere has two layers, because a ray that pierces a sphere touches it in two places, no matter how it is viewed (i.e., the ray always passes through two surfaces). So a sphere can be rendered twice to can get the solution (because it has two layers).

As described above, depth peeling is typically very expensive because it requires a lot of passes, and if a scene is being rendered that has many transparent layers in depth, the geometry must be submitted many times to get the correct answer. Researchers looking at this saw that it was reasonably inefficient. Some researchers have proposed methods to sub-divide the problem to improve performance. In theory, they thought they could reduce it to get closer to linear time. In one proposal, if the depth bounds of the scene are known, an algorithm can figure out all of the geometry that is close to the viewer and peel that. For example, the algorithm may apply depth peeling to the first half of the depth range or the first quarter of the depth range of the scene. In other words, the depth range may be divided up for the scene. The algorithm may determine which are the closest surfaces and which are the furthest surfaces from the camera or viewer and group them together (e.g., into one or more groups of surfaces that are closer to the viewer, and one or more other groups of surfaces that are further from the viewer). Using this approach, depth peeling could be performed on a first set of surfaces and then separately on a second set of surfaces, and the results would be composited together. For example, if there are two spheres in a scene and one is far behind the other one, the traditional depth peeling algorithm could require four passes to peel all the layers of the two spheres. But if the spheres do not overlap in space, depth peeling could be performed through the first sphere, and depth peeling could be performed separately on the second sphere, and then the algorithm could composite those two results together. The basic idea of this approach was to break the problem into sub-problems and perform depth peeling separately on each of the sub-problems (e.g., on different depth ranges and/or objects), and then to composite the results at the end to get the correct solution. Note that this approach could be applied to any number of groups of depth layers, but may still be very expensive, depending on the overall complexity of the scene.

The system and methods disclosed herein may in some embodiments significantly improve the performance of graphics applications when rendering scenes that include semi-transparent surfaces, compared to traditional depth peeling techniques and depth peeling techniques that merely divide the problem into sub-problems. The methods disclosed herein include several pixel-level techniques for correctly rendering complex scenes with order independent transparency. These techniques may be viewed as enhancements to traditional depth peeling that run more efficiently when the stream of surfaces includes one or more contiguous spans of correctly sorted surfaces. In other words, the techniques may exploit the presence of surfaces that are at least partially sorted, but they may not require perfect sorting. For example, in one embodiment, the method may include performing a sorting operation on objects and/or triangles in advance, so that they are partially sorted prior to applying depth peeling and/or other techniques. Following this sorting operation, there may be a few surfaces out of order in some places (e.g., through some pixels), but they may be mostly sorted. In other embodiments, the methods may take advantage of input geometry that includes one or more spans of perfectly sorted surfaces. The algorithms may keep track, through each pixel, of these coherent, in-order streams, so that they can composite multiple layers together in a single iteration. In other words, the method may in some embodiments be configured to discover when surfaces are in the correct order and/or to take advantage of spans of surfaces that are perfectly sorted. In the best case, if there are a number of geometric primitives in space that are correctly sorted, the algorithm would detect that they are correctly sorted, and would just take one iteration to produce an output image.

In some embodiments, the user, or a pre-processing operation, may partially sort the geometry prior to rendering it. In such embodiments, the method may not be required to chop up triangles at intersections or to be able to sort surfaces in a cyclically overlapping case. The sorting operation may be configured to sort the geometry as well as possible, given any such intersections and overlaps. In some embodiments, (e.g., if the camera is not moving very fast), a sorting operation may be repeated periodically (or only infrequently) to maintain coherence. However, the algorithms may work efficiently even if the surfaces are only mostly (or partially) sorted. When the algorithms detect a string of surfaces in the correct order, they may apply a simple method (e.g., a reverse painter's algorithm) in a single pass to composite those correctly ordered surfaces together. Where the algorithms encounter surfaces that are out of order, the algorithms may apply depth peeling only to those out-of-order surfaces. As with traditional depth peeling, the algorithms may be applied through every pixel on each pass. In other words, for every pixel on the screen, the algorithm may be configured to determine which surfaces are in the correct order and which are not, to composite the in-order surfaces in a single pass, and to peel away the out-of-order ones. This method may in some embodiments result in significant performance improvements over traditional depth peeling, since depth peeling may not need to be applied to every pixel and for every depth layer.

Various techniques for efficient rendering of transparent surfaces that exploit partial ordering in the scene geometry are described herein. As previously noted, some may be executed on slightly older hardware, such as currently available CPUs and/or first generation GPUs, while others may be more efficient when executed on more modern graphics hardware. One technique, called hybrid layer peeling, may combine unordered meshes with ordered meshes in an efficient way, and in some embodiments may be well suited for rendering scenes such as volumes with embedded transparent meshes. Hybrid layer peeling may in various embodiments be implemented using either legacy or modern hardware. Another technique, called coherent layer peeling, may efficiently detect and render correctly sorted fragment sequences for a given pixel in one iteration, allowing for a smaller number of passes than traditional depth peeling for typical scenes. Several variants of coherent layer peeling are described herein, including one that may be implemented using older hardware, and another that may be more efficient when implemented using more modern hardware.

Though more expensive than hybrid layer peeling by a constant factor, coherent layer peeling may in various embodiments be applied to a broader class of scenes, including single meshes or collections of meshes. Since it does not depend on the presence of any perfectly sorted spans of surfaces, coherent layer peeling may not require costly clipping or perfect sorting. However, the performance of the method may be dependent, at least in part, on the degree to which the data is sorted. As previously noted, at best, in some embodiments, this method may render correct transparency in a single iteration thus resulting in a running time of $O(n)$. When the data is sorted in reverse order, the method complexity may be similar to that of a standard depth peeling approach. A modified form of coherent layer peeling designed for an idealized rasterization architecture is also disclosed. In various embodiments, such an approach may match the performance of depth peeling even in the worst case, while still exploiting correctly sorted sequences to outperform depth peeling when they are present.

As previously noted, much research has gone into improving the performance of traditional depth peeling. In the research summarized above, it was noted that the asymptotic complexity of depth peeling may be reduced in many cases to $O(n)$ by decomposing the problem into smaller sub-problems. For example, in one approach, objects are placed in a heap, effectively sorting them in $O(n \lg n)$ from front-to-back. In this approach, a fixed small number of objects are extracted from the heap in sets to form a set of batches. If the depth range of each batch does not overlap, then traditional depth peeling is performed on each batch and compositing (front-to-back) is done to accumulate the solution. In the case of overlapping batches, clipping planes are used to define a z-range for the current batch. Any objects (even objects not in the batch) that span this range must also be included when processing the current batch. As noted above, this algorithm works well when batches do not overlap each other much in depth. Since perfect object level sorting is not required by this algorithm, heap sorting may be replaced with a linear time bucket sort to achieve a running time of $O(n)$ for many scenes. With bucket sorting, the surfaces are viewed through each pixel based on z-ranges. When using such an approach, depth peeling may then be applied to each z-range bucket separately. Using this approach, surfaces are typically placed into all z-range buckets, which they overlap. This algorithm yields an approximate running time of $O((n/b)b^2)=O(bn)$, where b is the number of surfaces in each bucket. The algorithm achieves its best performance when a large number of buckets are chosen and a linear time bucket sort on z can properly order the data in z. In some cases, however, a simple bucket sort cannot effectively order the data. For example, this can occur when a large percentage of surfaces land within the same bucket. Furthermore, this method requires bucket sorting of the surfaces on each frame.

Another recently proposed approach involves performing object level sorting using graphics hardware and the occlusion query extension. Such an approach works well when the data can be properly ordered. However, in the presence of visibility cycles, clipping may still be necessary to resolve surface ordering. Numerous extensions to hardware have been proposed to allow more efficient handling of transparent surfaces. For example, some have proposed the idea of delay streams to improve the efficiency of handling transparent surfaces in graphics hardware.

Another approach involves storing lists of fragments that arrive at a given pixel along with their colors and depths. One group of researchers introduced the concept of the F-buffer, which captures streams of fragments through each pixel in an intermediate representation. The ordering of these fragments can be resolved in additional passes. Practical hardware implementations of the F-buffer have been described. A more restricted form of this concept, known as the k-buffer, restricts the size of fragments that can be stored at each pixel and provides a limited read-modify-write operation to this list. Another alternative uses the existing multi-sampling feature of graphics hardware along with stencil routing to store lists of fragments per pixel. To date, however, these extensions have not been implemented or are not widely available in consumer hardware.

Unlike some of the techniques described above, the method disclosed herein may require only simple legacy hardware capable of rendering into stencil and floating point buffers. A detailed description of a solution to the problem of efficient depth peeling is described below, along with a description of hardware features that may in some embodiments be suitable for making this approach practical. In addition, a detailed example of an efficient GPU-based method that may be used to implement this approach on existing hardware is described herein. Two alternate embodiments, one that relies on floating point blending operations, and another that may be implemented on an ideal rasterization architecture, are also described.

In various graphics applications, it is relatively common to have easily sorted transparent geometry, such as slices through a volume data-set or screen-aligned sprites. Often, however, these may intersect geometrically with other meshes, such as semi-transparent iso-surfaces or treatment beams. As noted above, for perfectly sorted geometry, only a single rendering pass may be required. However, as soon as the scene includes overlapping unsorted geometry, a more general technique such as depth peeling may be applicable. This may lead to a very large number of passes for high depth complexity scenes.

An extension to depth peeling may make use of the observation that the method may be segmented into alternating steps. This technique, called hybrid layer peeling, may in some embodiments be ideal for example scenes such as that shown in FIG. 6A, where a semitransparent surface, representing a beam, intersects a trivially sorted stack of volume slices. In other words, hybrid layer peeling may be well suited for application to geometry that is, or may be, divided into one or more sets of unsorted surfaces and one set of perfectly sorted surfaces. One embodiment of such a method is illustrated by the flow chart in FIG. 1. In this example, geometry representing a scene is received, as in 100. The scene may include one or more three-dimensional geometric primitives. As illustrated in FIG. 1, a hybrid layer peeling technique may in some embodiments divide the received geometry into sorted and unsorted fragments, as in 110. Note that the geometry may in some cases include a perfectly sorted set of surfaces and other sets of unsorted surfaces when received, or the method may include an operation to pre-sort, or to partially pre-sort, all or a portion of the surfaces of the three-dimensional geometric primitives in the scene prior to rendering it, in various embodiments. The method may continue with applying hybrid layer peeling to all applicable pixels of an image depicting the scene on each pass (i.e., all of the pixels whose values reflect various surfaces of the geometric primitives in the scene at the pixel locations). Note that FIG. 1 illustrates pre-processing operations and operations included in a single pass of a hybrid layer peeling algorithm. The operations illustrated in 120-140 are performed on each of the affected pixels in one batch during this pass. Additional passes (which include the operations illustrated as 120-150) may be repeated for additional surfaces, as shown by the feedback loop from the positive exit of decision block 155 to block 120.

In one step, for all pixels, the method may include finding the nearest surface by rendering one or more unsorted surfaces into a current clipping depth map using conventional depth peeling, as in 120. In the second step, for all pixels, a sorted fragment between the current clipping depth and a previous clipping depth of the geometry may be composited into the color buffer for the image, as in 130. In other words, in this example, the compositing operation may render surfaces clipped to a z-range between the previous peel depth and the current one, which corresponds to a span of perfectly sorted surfaces. As illustrated in FIG. 1, the unsorted fragments (i.e., those peeled as described in block 120) may be composited into the color buffer, as in 140. In this example, the current clipping depth map may then be copied into the pervious clipping depth map to be used to define the clipping z-range for a subsequent pass, as in 150. At this point all affected pixel locations have been processed together in this pass. If there are no more surfaces to be peeled, shown as the negative exit from decision block 155, an image may be output, as in 160. For example, an image representing the result of the hybrid layer peeling technique may be displayed on the screen and/or may be saved in memory for further processing (e.g., in subsequent passes). Otherwise, the operations illustrated in blocks 120-150 may be repeated for additional surfaces, as shown. In this example, the number of steps may be determined by the depth complexity of the unsorted surfaces.

A hybrid layer peeling technique may be described in more detail using the example pseudo-code below:

```
 1:  for all pixel sample locations do
 2:      zPeel ← zNear
 3:  end for
 4:  while gChanged = true do
 5:      for all pixel sample locations do
 6:          zPeelNext ← zOpaque
 7:      end for
 8:      for all unsorted geometry fragments do
 9:          if zPeel < zFragment < zPeelNext then
10:              zPeelNext ← zFragment
11:              gChanged ← true      // occlusion query
12:          end if
13:      end for
14:      for all sorted geometry fragments do
15:          if zPeel < zFragment < zPeelNext then
16:              Composite fragment into color buffer
17:          end if
18:      end for
19:      if gChanged = true then
20:          for all non-sorted geometry fragments do
21:              if zFragment = zPeelNext then
22:                  Composite fragment into color buffer
23:              end if
24:          end for
25:          swap(zPeel, zPeelNext)
26:      end if
27: end while
```

The number of total iterations of this method may be determined by the number of layer peels required for just the unsorted geometry, rather than the total depth complexity of the worst case pixel, including the sorted fragments. In some embodiments, this may lead to asymptotic performance improvements proportional to the depth complexity of the sorted geometry, which in the case of a volume stack, may be very high. Unfortunately, only a limited class of scenes may be accelerated by hybrid layer peeling, namely those in which one set of scene geometry is perfectly sorted. A more general class of this method may automatically exploit correctly sorted fragment sequences at each pixel where they exist and correctly render unordered fragment sequences as they arise. Such a method is described below.

In the ideal case, a technique for correctly rendering semi-transparent surfaces may execute in linear time. For example, assume there is a list (i.e., a set) of transparent surfaces S that intersect the line segment emanating out of the camera through a given pixel center between the near and far plane. To properly composite these surfaces together they must be blended in front-to-back or back-to-front order. In either case, this operation may require sorting of the surfaces in S based on depth. For a set of arbitrarily placed surfaces, sorting may be done in $O(n \lg n)$. When bucket sorting works, these surfaces may be sorted in $O(n)$. However, these requirements place assumptions on the placement of surfaces.

Rather than making such assumptions, the system and methods described herein may use the property of coherency. In some embodiments, it may be assumed that the surfaces in S are mostly, or at least partially, in sorted order to begin with, and that only the ordering of a small constant number of surfaces may need to be fixed. In practice, this assumption often holds true, since data may be sorted up front based on a given camera view and updated periodically as the camera moves and/or the scene changes. For a practical scene with a smoothly moving camera and geometry it may be unlikely that the surfaces will become completely out of order from frame to frame. As noted above, the asymptotic performance of the techniques described herein may be tied to the number of correctly sorted uninterrupted spans in the list S.

Figure 2:
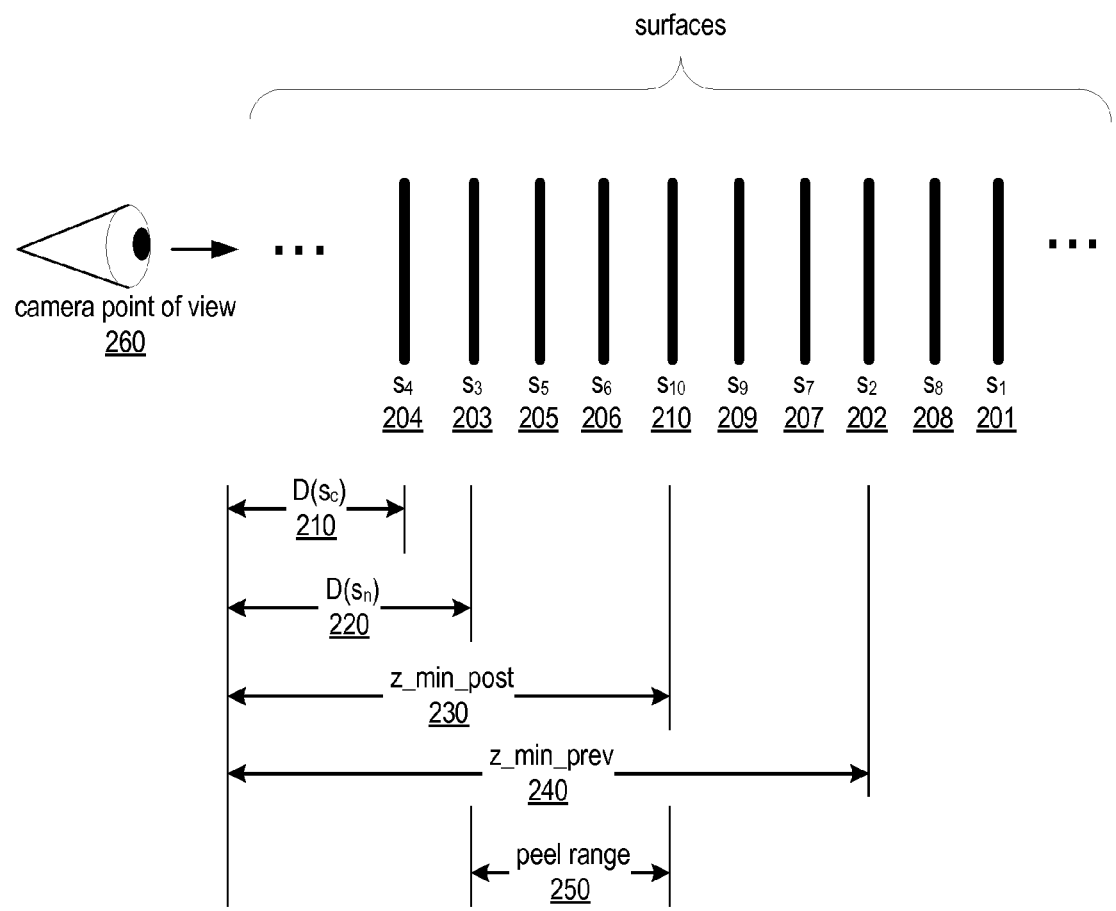
FIG. 2 illustrates determination of a peel range for a sequence of partially sorted surface, according to one embodiment.

The system and methods for correctly rendering complex scenes with order independent transparency may be further explained by way of example. In this example, let $s_0 \ldots s_{n-1} \in S$ be the list of mostly (or partially) ordered surfaces that intersect the ray segment emanating out of the camera through a given pixel center between the near and far plane. For any $s_i \in S$, let $D(s_i)$ denote the z-depth of the surface. In this example, it is assumed that the surfaces are mostly sorted in a front-to-back manner and that depth peeling has been performed up to some surface $s_c$. FIG. 2 shows one such sequence of mostly sorted surfaces $s_1$ to $s_{10}$ (elements 201-210). The methods described herein may in some embodiments be used to find the depth of the next out-of-order surface in the z-range $(D(s_c), \infty]$. In the example illustrated in FIG. 2, the last peeled surface is given by $s_4$, and the next out-of-order surface in the sequence is $s_9$. In this example, all surfaces within peel range 250, $[D(s_3), D(s_{10})]$ are by definition guaranteed to be in the correct order.

Figure 3:
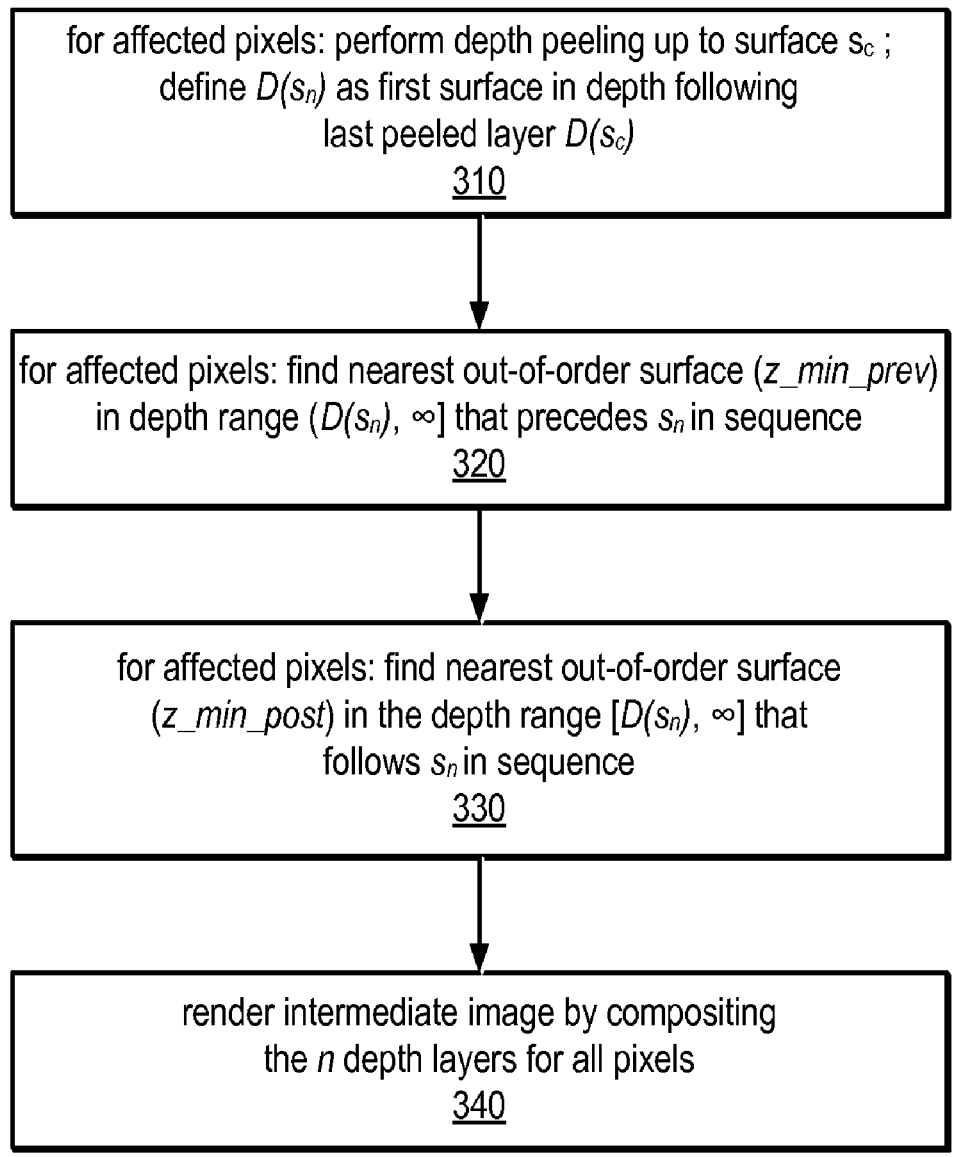
FIG. 3 is a flow diagram illustrating a method for rendering composite transparent surfaces, according to one embodiment.

One embodiment of a method for rendering a complex scene with order independent transparency, such as that represented by the surfaces in FIG. 2, is illustrated by the flow chart in FIG. 3. In this example, for all affected pixels, standard depth peeling may be performed up to a surface $s_c$, inclusive, as described above (e.g., $s_c$ corresponds to $s_4$, or element 204, in FIG. 2). This is shown in block 310. In this example, $D(s_n)$ may be defined as the first surface in depth following the last peeled layer $s_c$.

In the embodiment illustrated in FIG. 3, the method may include, for all affected pixels, finding the nearest out-of-order surface in the depth range $(D(s_n), \infty]$ that precedes $s_n$ in sequence, as in 320. In some embodiments, this may include examining the set of surfaces submitted prior to $s_n$. By definition, any surface that comes before $s_n$ in the list whose depth is greater than $s_n$ is an out-of-order surface. This list of surfaces may be defined as follows: $\hat{S} = \{s: s_i \in S, i < n, D(s_n) < D(s_i)\}$. The method may include finding the nearest depth of any such surface if one exists. This may given by:

| | | |
|---|---|---|
| z_min_prev = arg min$_{\hat{s} \in \hat{S}} D(\hat{s})$, | if $\hat{s} \neq 0$ | OR |
| z_min_prev = $\infty$, | otherwise | |

In this example, the depth z_min_prev may provide a loose bound on the depth range of surfaces that are in order. Any coherent list of surfaces may now be assumed to fall within the range $[D(s_n)$, z_min_prev$)$.

In the embodiment illustrated in FIG. 3, the method may include, for all affected pixels, finding the nearest out-of-order surface in the depth range $[D(s_n), \infty]$ that follows $s_n$ in sequence, as in 330. In some embodiments, the method may include considering the set of surfaces that occur after $s_n$ in the list and finding the nearest depth of any out-of-order surface that comes after $s_n$ in the list. This list of surfaces $\check{S}$ may be given by:

$$\check{S} = \{s_i : s_i \in S, i > n, D(s_n) \leq D(s_i), D(s_i) \leq D(s_{i-1})\}$$

In this example, the nearest depth of any surface that occurs after $s_n$ in the list may be given by:

| | |
|---|---|
| z_min_post = arg min$_{\hat{s} \in \check{S}} D(\hat{s})$, | if $\hat{s} \neq 0$ |
| z_min_post = $\infty$, | otherwise |

The depth z_min_post may in some embodiments provide a loose bound on the depth range of coherent surfaces. In this example, a tight bound on the peel range may now be given by: $([D(s_n), \min(\text{z\_min\_prev}, \text{z\_min\_post})])$.

The method may in some embodiments include rendering an intermediate image (e.g., for the surfaces up to, but not including, the peel range) by compositing the n depth layers for all pixels, as illustrated in block 340 of FIG. 3. Given the peel range interval, the method may in some embodiments include rendering the surfaces S clipped to the peel range. In this example, the surfaces within the peel range are guaranteed to be in correct front-to-back order, so compositing may be done in a single pass through the data.

Note that in some embodiments, a coherent layer peeling technique may include an operation to pre-sort, or partially pre-sort, all or a portion of the surfaces of the three-dimensional images in the scene, as described with respect to hybrid layer peeling above. The method may then continue with applying pixel-based coherent layer peeling to each of the pixels of an image depicting the scene. In other embodiments, coherent layer peeling may be applied to received image data that includes some pre-sorted surfaces and some unsorted surfaces, and the coherent layer peeling technique may not include an explicit sorting operation. In still other embodiments, a coherent layer peeling technique may include two or more sorting operations. For example, a sorting operation may pre-sort a sub-set of the surfaces of the scene elements (e.g., those in a given z-range), and those surfaces in the sub-set that are sorted into depth order may be composited into an image buffer without performing depth peeling. Depth peeling may then be applied to other surfaces in the sub-set of surfaces that were not sorted into depth order, as described above. Following processing of one sub-set of surfaces, a sorting operation may be used to pre-sort another sub-set of surfaces, and the techniques described herein may be applied to the sorted and/or unsorted surfaces of the second sub-set. This may in some embodiments be repeated for multiple sub-sets (e.g., z-ranges) of surfaces and the results may be composited together to produce the final image.

Figure 4:
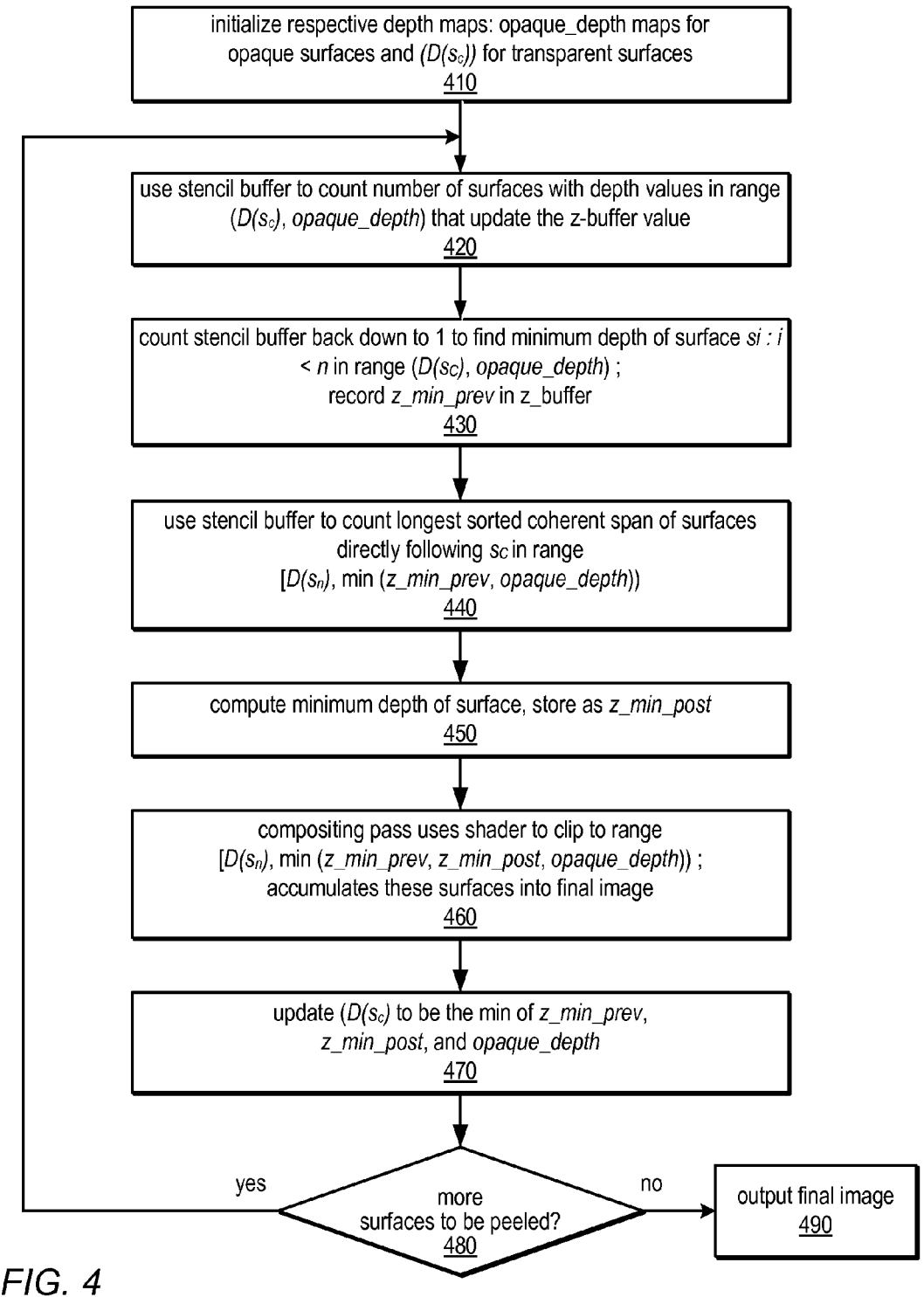
FIG. 4 is a flow diagram illustrating a method for rendering composite transparent surfaces using a GPU, according to one embodiment.

The method illustrated in FIG. 3 may in some embodiments be implemented using modern graphics hardware. For example, FIG. 4 illustrates one embodiment of a method in which the operations described in reference to FIG. 3 may be mapped onto a GPU. In this example, the method may include an initialization operation, as in 410. Initialization may in some embodiments include separating out opaque surfaces in a three-dimensional scene from transparent ones for rendering efficiency. For example, the opaque objects may be rendered into a depth map, called opaque_depth. In this example, the method may also include initializing a depth map for the transparent surfaces (called $D(s_c)$) to the z-near plane. In this example, these two buffers may encode the depth range between which transparent ordering is to be resolved.

As in the example illustrated in FIG. 3, the method illustrated in FIG. 4 may include, finding the nearest out-of-order surface in the depth range $(D(s_n), \text{opaque\_depth})$ that precedes $s_n$ in sequence. In the example illustrated in FIG. 4, this step is broken down into two passes. The inputs to this step may in some embodiments include the interval $(D(s_c), \text{opaque\_depth})$ stored in maps, and the output of this step may be the interval $(D(s_n), \text{z\_min\_prev})$. As shown in block 420 of FIG. 4, this step may include, counting the number of surfaces that update the z-buffer value and whose depth values lie in the range $(D(s_c), \text{opaque\_depth})$. In this example, the stencil buffer may be used to store this count. The depth range clipping may in some embodiments be done in a simple fragment shader. In one embodiment, the OpenGL state required for rendering this pass (i.e., Pass 1) is as follows:

```
glClearStencil (0);
glClearDepth (1.0);
glStencilMask (0xFF);
glClear (DEPTH_AND_STENCIL_BUFFER_BITS);
glEnable (DEPTH_TEST);
glDepthFunc (LESS);
glEnable (STENCIL_TEST);
glStencilFunc (ALWAYS, 0, 0xFF);
glStencilOp (KEEP, KEEP, INCR);      // fail, zfail, zpass
drawTransparentObjects ( );          // draw transparent objects
```

Since the method may include clipping to the range ($D(s_c)$, opaque_depth) in the fragment shader, the stencil counting process may only be impacted by surfaces $s_i$ where $i \leq n$. As soon as surface $s_n$ flows through, $D(s_n)$ may be written to the depth buffer and all subsequent surfaces (e.g., $s_i$: $i>n$) may fail the z-test. At the end of this pass, the stencil may hold a count of the number of surfaces that updated the z-buffer. In some embodiments, this count may include the update to the z-buffer by $s_n$. In this example, the depth buffer may hold $D(s_n)$, which may be used in subsequent steps.

In the example illustrated in FIG. 2, the following surfaces update the stencil buffer: $s_1$, $s_2$, and $s_3$. Thus, according to the method illustrated in FIG. 4, the stencil buffer may be set to 3 and the depth buffer to $D(s_3)$.

Note that in some embodiments, the stencil count may be invalid if there are more than 255 surfaces that are in the incorrect order, and the count may overflow. Although this situation may occur in a very complex scene, in most cases, it may be prevented by providing a high-level sorting of the surfaces, which may virtually eliminate the chance of the stencil overflow. A more robust method, one that may take advantage of available floating point blending, is described below.

As shown in block 430 of FIG. 4, the method may include, counting the stencil buffer back down to 1 to find the minimum depth of any surface $s_i$: $i<n$ in the range ($D(s_c)$, opaque_depth]. To do this, the geometry may in some embodiments be rendered again, using the same depth comparison logic, counting down the stencil and only passing the stencil test if the stencil count is greater than one. In this example, the result of this process records z_min_prev into the z-buffer. In one embodiment, the OpenGL state for the rendering pass (i.e., Pass 2) may be as follows:

```
glClearColor (1.0 ,1.0 ,1.0 ,1.0);
glClear (COLOR_AND_DEPTH_BUFFER_BITS);
glEnable (DEPTH_TEST);
glDepthFunc (LESS);
glEnable (STENCIL_TEST);
glStencilFunc (LESS, 1, 0xFF);
glStencilOp (KEEP, KEEP, DECR);
drawTransparentObjects ( );          // draw transparent objects
```

In the example illustrated in FIG. 2, rendering may skip $s_1$ and stop at $s_2$, because after rendering $s_2$ and setting the depth to $D(s_2)$, the stencil count reaches 1 and the pixel is not updated any more.

As in the example illustrated in FIG. 3 (block 330), the method illustrated in FIG. 4 may include, finding the nearest out-of-order surface in the depth range [$D(s_n)$, min (z_min_prev, opaque_depth) that follows $s_n$ in sequence. Again, this step may in some embodiments involve two passes. For these two passes all surface fragments that fall outside the range [$D(s_n)$, min (z_min_prev, opaque_depth)] may be clipped using a simple fragment shader, in some embodiments. Note that as it follows from the step described in block 320 of FIG. 3, all surfaces $s_i$ with $i<n$ fall outside this range. Therefore, they play no role in Pass 3 or Pass 4.

As illustrated in block 440 of FIG. 4, the method may include, counting the longest sorted coherent span of surfaces (i.e., the number of correctly ordered surfaces) that directly follows $s_c$ in the range [$D(s_n)$, min (z_min_prev, opaque_depth)]. In some embodiments, this may be performed by setting the z-test to GREATER, and incrementing the stencil count each time a surface passes the z-test. In such embodiments, the first surface that fails the z-test will invert the stencil value and cause the stencil test to cull away all remaining surface fragments. In this example, the result of this pass (i.e., Pass 3) may be a stencil value that gives an upper bound on the number of surfaces that are in the correct depth order following $s_c$. In one embodiment, example pseudo-code for this pass may be as follows:

```
glClearStencil(0);
glClearDepth(0);
glClear (DEPTH_AND_STENCIL_BUFFER_BITS);
glEnable (DEPTH_TEST);
glDepthFunc (GREATER);
glEnable (STENCIL_TEST);
glStencilFunc (GREATER, 128, 0xFF);
glStencilOp (KEEP, INVERT, INCR);      // fail, zfail, zpass
drawTransparentObjects ( );
```

In the example illustrated in FIG. 2, the stencil buffer is incremented for surfaces $s_3$, $s_5$, $s_6$, and $s_7$. Therefore, in this example, the surface $s_9$ may invert the stencil value of 4 to 251 and set the depth to $D(s_9)$.

Note that in some embodiments there may not be any overflow issues in this pass. If there are more than 128 surfaces in proper order, when the stencil count reaches 128 the counting stops and it may be assumed that the last surface was out of order. Consequently, in some embodiments, this pass may process at most 128 surfaces in one iteration of the method.

As described above, in Pass 3 the number of sorted z-coherent surfaces in the longest span of sorted z-coherent surfaces that directly follow $D(s_c)$ may be counted. However, there may be other surfaces $s_j$: $j>n$ that interrupt this coherent span (for example, surface $s_{10}$ in FIG. 2). In this example, in Pass 4 the minimum depth of such surfaces may be computed, as shown in block 450 of FIG. 4. This value may be stored as z_min_post. The logic included below for Pass 4 may in one embodiment be used to cull away the first k surfaces that form the longest coherent span (as counted in Pass 3) using the stencil test and incrementing the stencil each time the stencil test fails. In this example, once the stencil value reaches 255, the remaining surfaces may flow through the pipeline and the one with the minimum depth may be found using z-buffering with LESS.

```
glClearColor (1.0 ,1.0 ,1.0 ,1.0);
glClearDepth (1.0);
glClear (COLOR_AND_DEPTH_BUFFER_BITS);
glDepthFunc (LESS);
glStencilFunc (EQUAL, 255, 0xFF);
glStencilOp (INCR, KEEP, KEEP);      // fail, zfail, zpass
drawTransparentObjects ( );
```

In the example illustrated in FIG. 2, Pass 4 may skip surfaces $s_3$, $s_5$, $s_6$, and $s_7$ and may render surfaces $s_9$ and $s_{10}$. The depth value may be set to $D(s_{10})$, in this example.

As in the example illustrated in block 340 of FIG. 3, the method illustrated in FIG. 4 may include, compositing the n depth layers, which may in some embodiments involve two passes. As discussed above, the surfaces that lie in the interval [D($s_n$), min (z_min_post, z_min_prev, opaque_depth)] may be guaranteed to be in an uninterrupted correct depth order. Therefore, in some embodiments, a standard compositing pass may use a fragment shader to clip to this range to accumulate these surfaces into the final image. This pass (i.e., Pass 5) is shown as block 460 in FIG. 4.

Note that in some embodiments, the surface at the upper bound of the peel range may be an out-of-order surface (e.g., in case the z_min post is not set, such as if the surface $s_3$ in FIG. 2 was directly followed by surface $s_2$). In such embodiments, since this depth is known, the method may include peeling this surface away as well using a z equals test in an additional compositing pass (i.e., Pass 6, not shown). In this case, the method may peel away (in the worst case) two layers per iteration of the process.

As shown in FIG. 4, once the coherent range of surfaces has been composited, D($s_c$) may be updated, to be the minimum of z_min_prev, z_min_post, and opaque_depth. This is shown as block 470. The process illustrated in blocks 420-470 may in some embodiments be repeated until no surfaces remain to be peeled. This is illustrated by the feedback loop from the positive exit from decision block 480 to block 420. In some embodiments, the method may include detecting when this occurs using occlusion queries during the compositing phase (not shown). Once there are no more surfaces to be peeled, shown as the negative exit from block 480, a final composite image may be output, as in 490. For example, an image representing the result of this pass of the coherent layer peeling technique may be displayed on the screen and/or may be saved in memory for further processing (e.g., in subsequent passes).

Note that in one embodiment, the method may include rendering a full screen polygon with depth map opaque_depth after Pass 2 to obtain min(z_min_prev, opaque_depth) and then rendering a polygon with the resulting map min (z_min_prev, opaque_depth) after Pass 4. In such an embodiment, it may be possible to eliminate one comparison in the fragment shader in Passes 1-4, and to eliminate two comparisons in Pass 5.

Figure 5:
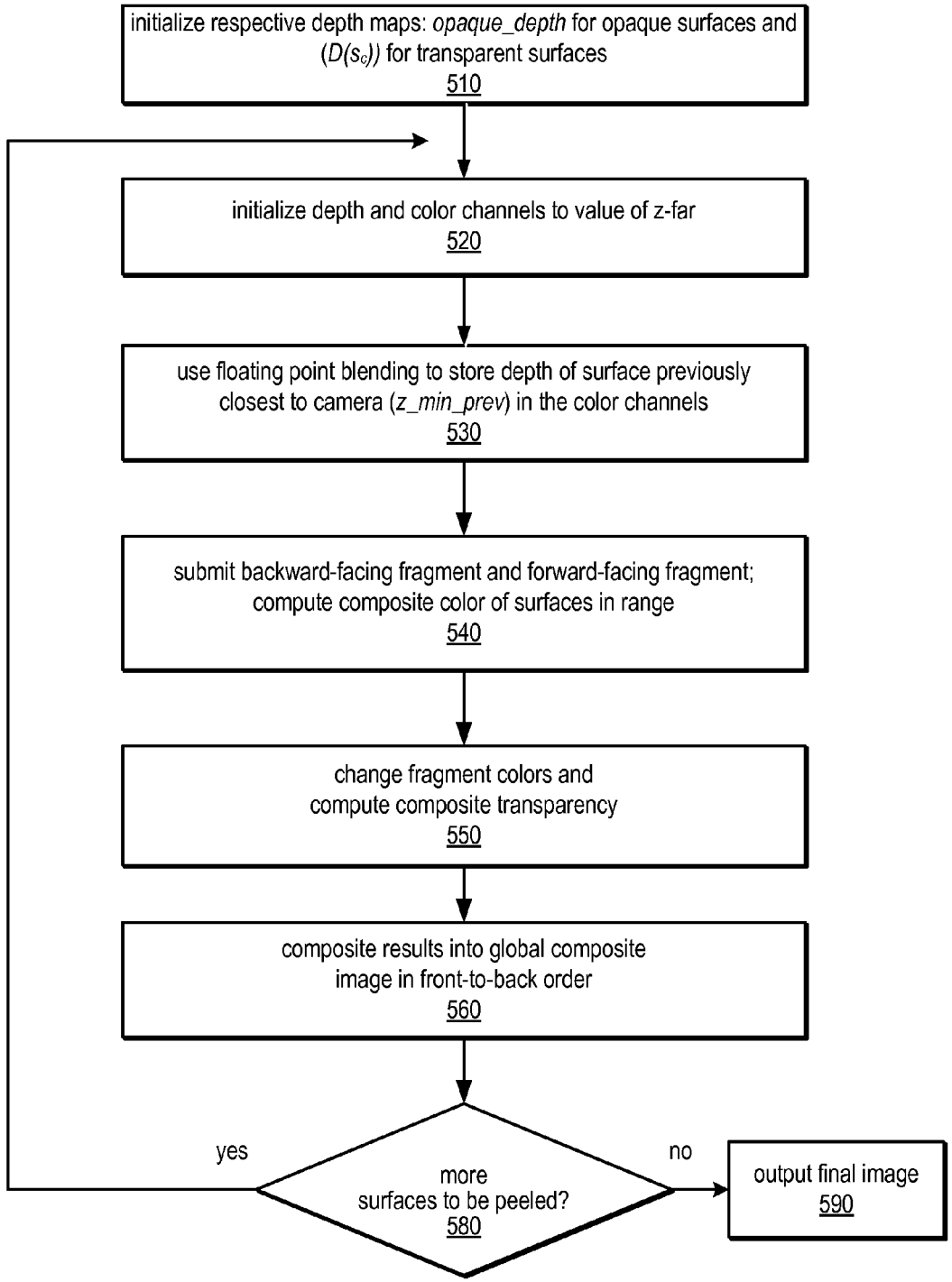
FIG. 5 is a flow diagram illustrating a second method for rendering composite transparent surfaces using a GPU, according to one embodiment.

As noted above, an alternative embodiment of the method described above may make use of floating point image blending to achieve a reduction in the number of passes. For example, Pass 1 and Pass 2 may be replaced by a single pass, bringing the total count to five. One such embodiment is illustrated in FIG. 5. As shown in block 510, the method may include initializing various buffers (e.g. depth maps), as in the previous described embodiments.

As in the previous examples, the method illustrated in FIG. 5 may again include finding, the nearest out-of-order surface in the depth range (D($s_n$), opaque_depth) that precedes $s_n$ in sequence. As shown in block 520, the depth and color channels may be initialized to have a value of z-far. In this example, floating point blending may be used to store the depth of the surface that was previously closest to the camera in the color channels, as in 530. When the geometry is rendered, the method may include setting the color to 1.0, 1.0, 1.0, and the alpha to the fragment depth. In some embodiments, by using a blend method that multiplies the source color by the destination alpha, the depth of the previous surface in the frame buffer may be moved to the color channels of the frame buffer. In this example, the result of this pass may store a value of z_min_prev in the color channels. In one embodiment, the OpenGL state required for rendering this pass is as follows:

```
glClearStencil (0);
glClearDepth (1.0);
glClearColor (1.0 ,1.0 ,1.0 ,1.0);
glClear (COLOR_AND_DEPTH_BUFFER_BITS);
glEnable (DEPTH_TEST);
glDepthFunc (LESS);
glEnable (BLEND);
// multiply source color by destination alpha
// set alpha to source alpha
glBlendFuncSeparate (ZERO, DEST_ALPHA, ONE, ZERO);
drawTransparentObjects ( );            // draw transparent objects
```

As illustrated in FIG. 5, the method may again include finding the nearest out-of-order surface in the depth range [D($s_n$), min (z_min_prev, opaque_depth)] that follows $s_n$ in sequence. In this example, this step may involve two render targets, one to compute the composite image and the second to compute the new z peel depth for the next stage of the process. In this example, the method may include submitting each fragment twice, once as a forward-facing fragment and the second as a backward-facing fragment, as shown in block 540. In some embodiments, the buffers may be cleared to have a depth of z-far and a stencil of 1. Using a z-test of "fragment nearer than or equal to destination" passing, the method may include rendering fragments closer than z_min_prev and further than z-peel.

In some embodiments, the polygons may be rendered using an estimate of back-to-front order according to the following rules:

For the first fragment of the fragment pair (i.e., backward-facing fragments):

The color is set to 0.0, 0.0, 0.0 and alpha is set to one. If this fragment is drawn it resets the color to black, on which will be composited other colors.

Stencil test: Greater than zero. If the stencil fails: stencil keep. If the stencil passes and z-passes: stencil keep. If the stencil passes and z-fails: stencil keep.

For the second fragment of the fragment pair (i.e., forward-facing fragments).

The color is the surface color and the alpha is the surface alpha.

Stencil test: Always true. If the stencil passes and z-fails: set stencil to one. If the stencil passes and z-passes: clear stencil.

As shown in block 540, this step may successfully compute the composite color of the surfaces between z_min_prev and z-peel. However, it may not compute the correct transparency value, since the alpha of the flipped fragments is set to 1.0 (a transparency of zero). To solve this problem, the method may include a second render target performing the same compositing as the first one, but with the forward-facing fragment colors set to the fragment transparency value and the color of the backward-facing fragments set to one, as in 550. The method may in some embodiments use a blend rule that multiplies the source color with the destination color. In some embodiments, a third render target may use the same rules but may set the backward-facing fragments to have a color of z-frag and an alpha of 1.0, and the forward-facing fragments to have a color of zero and an alpha of zero. In such embodiments, the third render target may use an over blend mode.

As shown in block 560, the method may include compositing the result from the previous steps into a global composite image (in front-to-back order). In some embodiments, this may be implemented using a full screen quad. As in the previous example, the operations illustrated in blocks 520 to 560 until there are no more surfaces to be peeled. This is illustrated as the feedback loop from decision block 580 to block 520 in FIG. 5. Once there are no more surfaces to be peeled, the method may include outputting a final image, as in 590. For example, an image representing the result of this pass of the coherent layer peeling technique may be displayed on the screen and/or may be saved in memory for further processing (e.g., in subsequent passes).

The method described above may in some embodiments require five geometry passes per iteration and may peel away at least two layers per iteration. Another embodiment, described below, may reduce the number of geometry passes to two, with only minor modifications required to existing hardware.

In one embodiment, an ideal rasterization engine may allow for efficient rasterization of geometry while permitting access to multiple destination buffers in a rasterization shader. In one such embodiment, the rasterization shader may be part of a general shader, computing color and alpha at the same time. In another embodiment, it may be executed on a finer scale, at the level of sub-pixel samples, with the surface material shader being amortized over several pixel sub-samples, as is sometimes done in current GPUs. Note that in some current GPUs, the rasterization shader is restricted to a limited frame-buffer state machine. The methods described herein may in some embodiments be implemented as an extension of such a state machine.

In this alternate embodiment, the rasterization shader may have available interpolated Z for the fragment at the sample location as well as multiple z values and additional integer values (equivalent to stencils) that could be read and written to in the equivalent of render targets. In such embodiments, the rasterization shader may be executed for each fragment in rasterization order for each pixel sub-sample. Such a system may enable several of the passes for conventional GPUs to be collapsed into a single pass. In one example, the inputs available to the rasterization shader may include:

zFragment—the interpolated depth of a fragment at the sample location zPeel—the final peel depth from the previous pass of the process zOpaque—the depth of the nearest opaque surface or z-far, whichever is nearest to the camera z1, z2, z3—a set of full precision buffers used to store z-values (either floating point or fixed point, in various embodiments)

gChanged—a single global changed bit, used to determine termination similar to an occlusion query One example of such a method for coherent layer peeling is illustrated by the pseudo-code below:

```
1:  for all pixel sample locations do
2:      z3 ← zNear
3:  end for
4:  gChanged ← true
5:  while gChanged = true do
6:      gChanged ← false;
7:      for all pixel sample locations do
8:          z1 ← zOpaque;
9:          z2 ← zOpaque;
10:         zPeel ← z3;
11:         zPostFlag ← false
12:     end for
13:     for all geometry sample locations do    // Pass 1
14:         if (zPeel < zFragment < z2) then
15:             gChanged ← true;
16:             if zFragment < z1 then
17:                 z2 ← z1
18:                 z1 ← zFragment
19:                 z3 ← z1                     // Reset the state for post
20:                 zPostFlag ← false
21:             else if zPostFlag = true then
22:                 if zFragment < z3 then
23:                     z3 ← zFragment
24:                 end if
25:             else
26:                 if zFragment < z3 then
27:                     zPostFlag ← true
28:                 end if
29:                 z3 ← zFragment
30:             end if
31:         else if zFragment = zPeel then
32:             Composite fragment into color buffer
33:         end if
34:     end for
35:     if gChanged = true then
36:         for all geometry sample locations do    // Pass 2
37:             if (zPeel < zFragment < z3) then
38:                 Composite fragment into color buffer
39:             end if
40:         end for
41:     end if
42: end while
```

As noted above, different methods for rendering transparent surfaces may be suited for different applications and/or input scenes. FIGS. 6A-6F illustrate various scenes including transparent surfaces to which various ones of the methods described herein have been applied.

To assess the value of the different methods, several metrics may be considered. One may be absolute timings of performance on current state-of-the-art hardware, and a second may be the number of geometry passes required to render a particular scene with correct transparency. Absolute performance may be practically interesting in the short term for obvious reasons. The number of required passes may be more theoretically interesting since it may indicate the value of a hybrid or coherent layer peeling method assuming further optimization of the rasterization hardware. Such optimization may be done, for example, by enabling an ideal coherent layer peeling method or by improving or merging passes of the current GPU-implemented method.

Figure 6A:
FIGS. 6A-6F illustrate various scenes on which standard depth peeling, hybrid layer peeling, and coherent layer peeling may be applied, according to various embodiments.
Figure 6B:
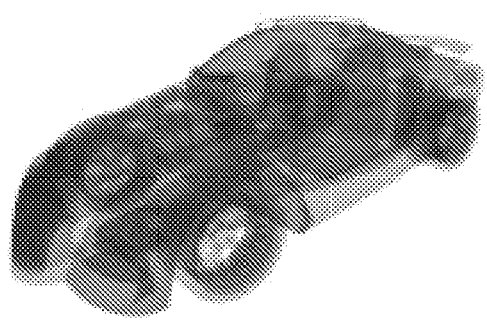
Figure 6C:
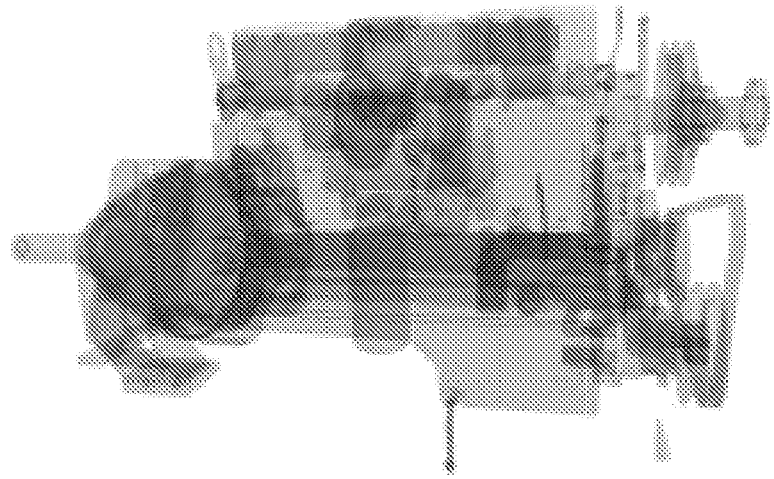
Figure 6D:
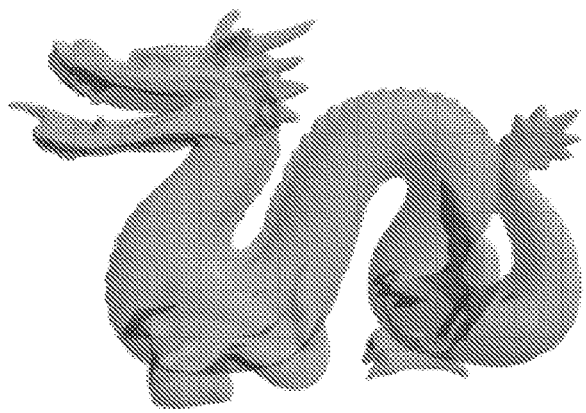
Figure 6E:
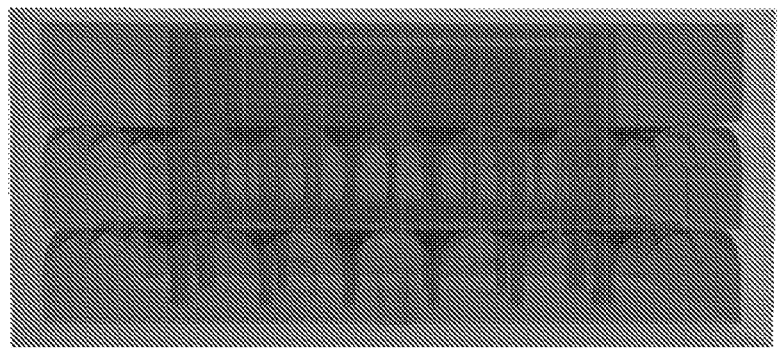
Figure 6F:
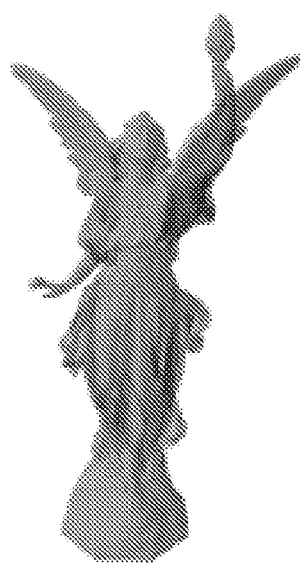
Figure 7:
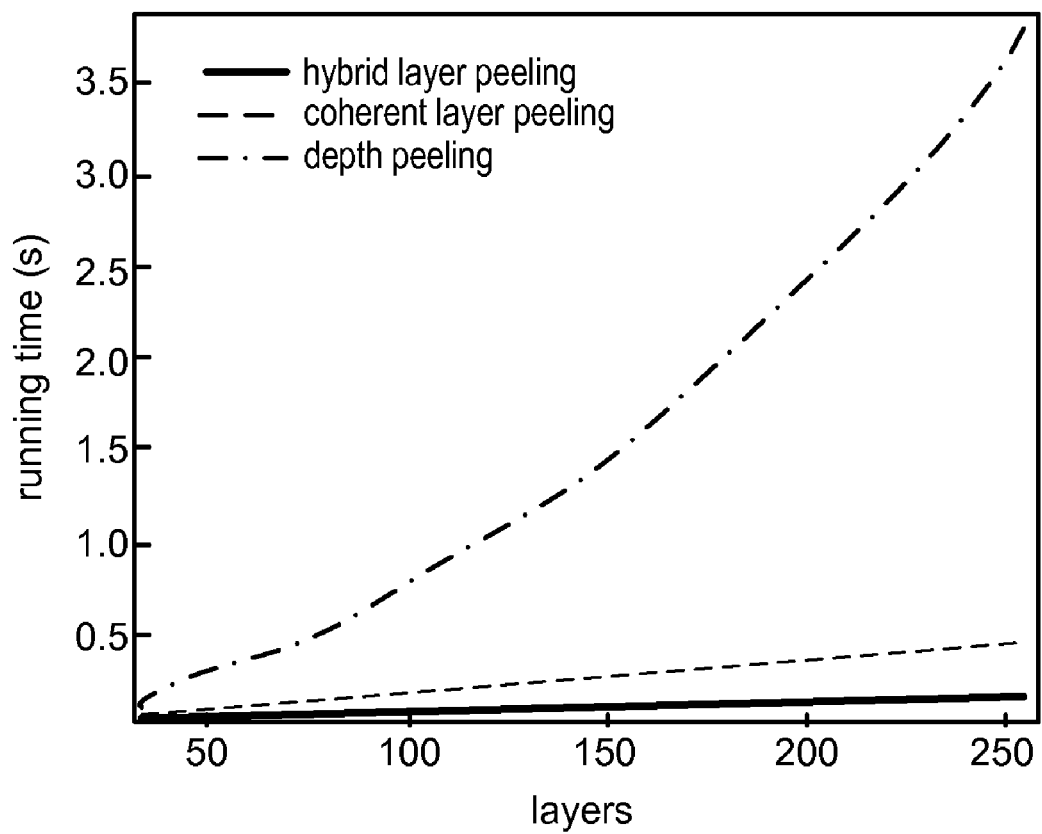
FIG. 7 is a graph illustrating the relative performance of standard depth peeling, hybrid layer peeling, and coherent layer peeling, according to various embodiments.

In general, all scenes that may be rendered by hybrid layer peeling may also be rendered by coherent layer peeling and traditional depth peeling. To determine how the methods scale with depth complexity, a stack of alpha-modulated planes representing a volume intersecting a conical shell representing a treatment beam have been rendered using the various methods described herein. Since the conical shell has very low depth complexity, this case may be well suited for hybrid rendering and coherent layer peeling. FIG. 6A shows the test scene, with the number of slices spanning the volume being a settable parameter. FIG. 7 illustrates the execution time associated with rendering the test scene using various methods, where the number of slices spanning the volume is a configurable parameter. In this example, the graph illustrates the absolute timing and number of required peels for each of the different algorithms. As shown in FIG. 7, the number of peels increases linearly with the number of volume layers for traditional depth peeling. The total time for traditional depth peeling increases faster than linear time. In contrast, the number of passes required by hybrid and coherent layer peeling remain constant, with the rendering times increasing linearly with the number of layers. For 256 layers, hybrid layer peeling achieved a 52-to-1 speed improvement over depth peeling. Coherent layer peeling was slower by a constant factor of approximately six. This may be due to the larger number of geometry passes per iteration of the method as well as the need for rendering the volume layers in each pass. In this example, for hybrid layer peeling, the volume slices only needed to be rendered for the compositing pass, not the depth peel pass.

To explore the performance of coherent layer peeling versus traditional depth peeling for more general scenes, a variety of models were used. The total number of layers required by traditional depth peeling depended, in part, on the location of the camera. In some cases a top and side view of some models were compared. In these examples, coherent layer peeling based on the methods described above resulted in up to a 3× speed improvement over traditional depth peeling. The floating point variant of the method was slower or faster than the stencil based version depending on the model. The variation may be due to the relative cost of fewer geometry passes for the floating-point blending method versus the more expensive bandwidth to the frame buffer. The performance measurements described in Table 1 are based on models provided by Marko Dabrovic (e.g., Sponza model), models provided by Stanford University Computer Graphics Laboratory (e.g., Dragon and Lucy models), or on models that are publicly available (e.g., Engine and Car models). The model illustrated in FIG. 6A (head volume dataset) is based on data taken on the Siemens Magnetom and provided courtesy of Siemens Medical Systems, Inc., Iselin, N.J.

Table 1 (below) illustrates frame rates, numbers of iterations, and numbers of geometry passes for various models rendered using the coherent layer peel method A, the advanced version with floating point blending B, and the standard depth peeling method.

TABLE 1

Relative performance of methods on various models

| model Figure | faces vertices | coherent peel A | coherent peel B | standard depth peel |
|---|---|---|---|---|
| Engine (FIG. 6C) | 133K faces 120K vert. | 22 fps 7 iter., 42 geom. | 23 fps 7 iter., 35 geom. | 21 fps 22 iter., 44 geom. |
| Dragon front | 150k faces 749K vert. | 51 fps 3 iter., 18 geom. | 53 fps 3 iter., 15 geom. | 35 fps 14 iter., 28 geom. |
| Dragon side (FIG. 6D) | 150K faces 749K vert. | 51 fps 3 iter., 18 geom. | 53 fps 3 iter., 15 geom. | 35 fps 14 iter., 28 geom. |
| Lucy end on | 250K faces 125K vert. | 37 fps 3 iter.. 18 geom. | 41 fps 3 iter., 15 geom. | 15 fps 22 iter., 44 geom. |
| Lucy front (FIG. 6F) | 250K faces 125K vert. | 36 fps 3 iter.18 geom. | 40 fps 3 iter., 15 geom. | 27 fps 12 iter., 24 geom. |
| Sponza end on | 66K faces 61K vert. | 36 fps 3 iter., 18 geom. | 40 fps 3 iter., 15 geom. | 12 fps 26 iter., 52 geom. |
| Sponza front (FIG. 6E) | 66K faces 62K vert. | 56 fps 3 iter., 18 geom. | 50 fps 3 iter., 15 geom. | 35 fps 16 iter., 32 geom. |
| Car front (FIG. 6B) | 730K faces 365K vert. | 0.28 fps 11 iter., 66 geom. | 0.34 fps 11 iter., 55 geom. | 0.27 fps 36 iter., 72 geom. |

As shown above, hybrid layer peeling may be somewhat narrow in applicability. However, it shows a significant performance improvement relative to traditional depth peeling and may be simple to implement on current GPUs. Coherent layer peeling may be applicable to a broader class of partially sorted scenes, and shows an up to 3× speed up on current hardware for typical test models. It may also serve as a basis of improved rendering hardware in the future that could allow it to at least match traditional depth peeling in the worst case, and have asymptotically better performance for high depth complexity scenes with good but not perfect sorting.

The methods described herein are largely focused on the rasterization logic of hybrid and coherent layer peeling. As described herein, coherent layer peeling may benefit from well-sorted scenes. Alternate embodiments may involve determining the ideal sorting algorithms and other heuristics, such as geometry dicing, when coherent layer peeling is the core rasterization algorithm. Various example implementations described herein used a simple bucket sort of triangle centroids. However, other sorting methods may be applied in other embodiments. Other embodiments may take advantage of improvements in GPUs as they become available and may yield significant speed-ups. Other embodiments may involve exploring how frame buffer state-machines may be enhanced to reduce the number of passes, as well as alternate implementations of the ideal method if suitable hardware becomes available. In some embodiments, Z-culling may facilitate efficiency of traditional depth peeling, and exploitation of z-culling in the context of coherent layer peeling may be addressed. Finally, as it becomes practical to render scenes with high transparent depth complexity, such rendering may be used effectively in visualization.

Figure 8:
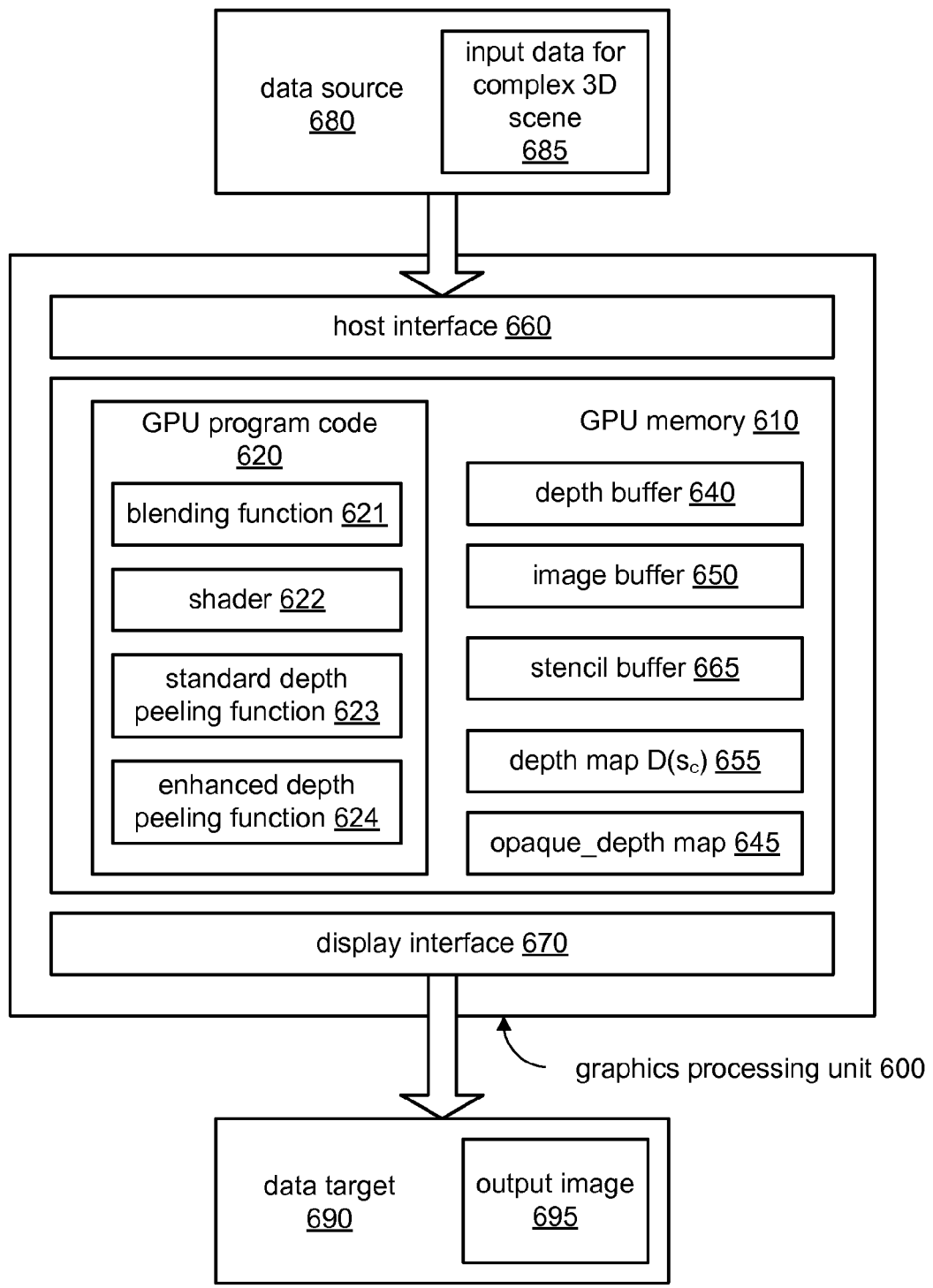
FIG. 8 is a block diagram illustrating one embodiment of a graphics processing unit (GPU) configured for rendering transparent surfaces in complex three-dimensional scenes.
Figure 9:
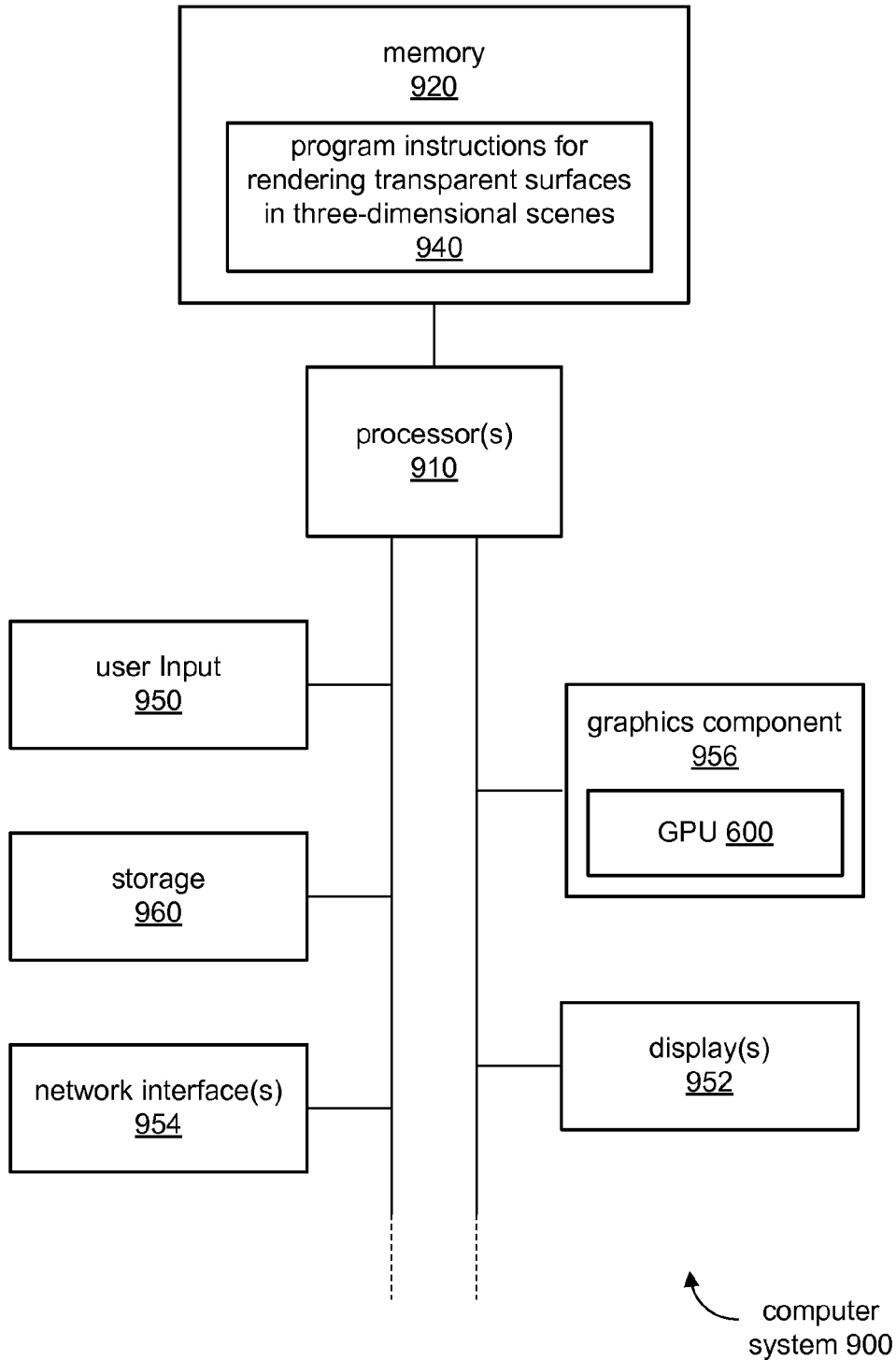
FIG. 9 is a block diagram illustrating constituent elements of a computer system that is configured to implement embodiments of the system and method for rendering transparent surfaces in complex three-dimensional scenes.

As previously noted, the methods described herein for correctly rendering complex three-dimensional scenes with order independent transparency may be implemented using modern graphics hardware, such as a graphics processing unit, or GPU. FIG. 8 is a block diagram illustrating one embodiment of a GPU 600 configured for rendering such scenes. The GPU 600 may comprise a dedicated graphics rendering device associated with a computer system. An example of a suitable computer system 900 for use with a GPU is illustrated in FIG. 9. The GPU 600 illustrated in FIG. 8 may include numerous specialized components configured to optimize the speed of rendering graphics output. For example, the GPU 600 may include specialized components for rendering three-dimensional models, for applying textures to surfaces, etc. For the sake of illustration, however, only a limited selection of components is shown in the example GPU 600 of FIG. 8. It is contemplated that GPU architectures other than the example architecture of FIG. 8 may be suitable for implementing the techniques described herein. The GPU 600 may implement one or more application programmer interfaces (APIs) that permit programmers to invoke the functionality of the GPU. Suitable GPUs may be commercially available from vendors such as NVIDIA Corporation, ATI Technologies, and others.

The GPU 600 may include a host interface 660 configured to communicate with a data source 680 (e.g., a communications bus and/or processor(s) 910 of a host computer system 900, or the host system itself). For example, the data source 680 may provide input data (e.g., a scene comprising one or more geometric objects including one or more transparent surfaces) and/or executable program code to the GPU 600. In some embodiments, the host interface 660 may permit the movement of data in both directions between the GPU 600 and the data source 680. The GPU 600 may also include a display interface 670 for providing output data to a data target 690. For example, the data target 690 may comprise a display device 952, and the GPU 600 (along with other graphics components and/or interfaces 956) may "drive" the display 952 by providing graphics data at a particular rate from a screen buffer (e.g., the image buffer 650).

In one embodiment, the GPU 600 may include internal memory 610. The GPU memory 610, also referred to herein as "video memory" or "VRAM," may comprise random-access memory (RAM) which is accessible to other GPU components. As will be described in greater detail below, the GPU memory 610 may be used in some embodiments to store various types of data and instructions such as input data, output data, intermediate data, program instructions for performing various tasks, etc. In one embodiment, the GPU 600 may also be configured to access memory 920 of a host computer system 900 via the host interface 660.

In one embodiment, program instructions 940 may be stored in the memory 920 of the host computer system 900 and executed by the host computer system 900 to generate output image 695 based on input data 685. Input data 685 may include data representing a scene comprising one or more geometric objects having one or more transparent surfaces in a sorted or arbitrary order, as described herein.

In one embodiment, the GPU 600 may include GPU program code 620 that is executable by the GPU 100 to perform aspects of the techniques discussed herein. For example, the geometric objects in the input 685 may be rasterized to pixels during a rendering process including execution of the GPU program code 620 on the GPU 600. Elements of the GPU program code 620 may be provided to the GPU 600 by a host computer system (e.g., the data source 680) and/or native to the GPU 600. In one embodiment, the GPU program code 620 may comprise one or more shaders 622 (e.g., a vertex shader, pixel shader, fragment shader, or rasterization shader). As illustrated in FIG. 8, GPU program code 620 may in various embodiments comprise one or more of a blending function 621, a standard depth peeling function 623, and an enhanced depth peeling function 624, as described herein. In generating the output image 695, any of these functions, or other functions included in GPU program code 620, may be executed at various points in the graphics pipeline.

The GPU memory 600 may comprise one or more buffers, and each buffer may comprise a two-dimensional array of pixel data (e.g., color values) and/or pixel metadata (e.g., depth values, stencil values, etc.). Each buffer may comprise a two-dimensional array of pixel data (e.g., color values) and/or pixel metadata (e.g., depth values, stencil values, etc.). As illustrated in FIG. 8, for example, the GPU memory 610 may comprise an image buffer 650. The image buffer 650 may store intermediate or final pixel values generated in the rendering process. In one embodiment, the image buffer 650 may comprise a single-sampling buffer wherein each pixel in the buffer is represented by a single set of color and alpha values (e.g., one color value for a red channel, one color value for a green channel, one color value for a blue channel, and appropriate values for a one or more alpha channels). In another embodiment, the image buffer 650 may comprise a multi-sampling buffer usable for automatic anti-aliasing.

As illustrated in FIG. 8, the GPU memory 610 may comprise various other buffers such as a depth buffer (i.e., Z-buffer) 640, a stencil buffer 665, a depth map $D(s_c)$ and an opaque_depth map 645, as described herein. In one embodiment, the image buffer 650 may be the same resolution as the target resolution of the data target 690. The image buffer 650 may comprise a screen buffer, which is provided directly to the data target 690. In one embodiment, the image buffer 650 and the depth buffer 640 may be the same resolution, and each location (i.e., a pixel) in the image buffer may correspond to a respective location in the depth buffer 640. Each value stored in the depth buffer 640 may indicate a relative depth or distance of the corresponding pixel from a viewpoint.

The GPU 600 may include various built-in functions to assist in the rendering of artwork. In one embodiment, the GPU 600 may include a Z-test (i.e., depth test) function operable to perform comparisons of Z-values (i.e., depth values in the depth buffer 640) and take action accordingly (e.g., keep or discard pixels). In one embodiment, the GPU 600 may include a stencil test function operable to perform comparisons of stencil values (e.g., in the stencil buffer) and take action accordingly (e.g., keep or discard pixels). Functions such as the Z-test and stencil test may be enabled, disabled, and/or otherwise configured through invocation of appropriate functions in the GPU API and/or by operation of the anti-aliasing program code 620.

As discussed above, program code 620 may include a standard depth peeling function 623 and an enhanced depth peeling function 624. In some embodiments, an enhanced depth peeling function 624 may include program instructions executable by the GPU to implement the methods described herein for correctly rendering order independent transparent surfaces. In other embodiments, program instructions 940 (shown in FIG. 9) may be used to implement these methods. In still other embodiments, the operations of a graphics application, including some of those described herein for rendering order independent transparent surfaces, may be divided between one or more CPUs and/or GPUs for execution. For example, the computations to determine the rendering parameters may be simpler on the CPU, and fewer instructions may be used in the pixel shader on the GPU. Furthermore, the computation in the GPU and/or CPU may be more robust for particular calculations performed by a graphics application. Various embodiments may be chosen to match the capabilities of a particular GPU 600 (e.g., the GPU 600 may lack a shader or other component illustrated in FIG. 8).

FIG. 9 is a block diagram illustrating constituent elements of a computer system 900 that is configured to implement embodiments of the system and method for rendering complex scenes having one or more order independent transparent surfaces. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows® from Microsoft Corporation, MacOS® from Apple Inc., or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s) 910. The graphics component 956 may include a GPU such as the GPU 600 illustrated in FIG. 8. Additionally, the computer system 900 may include one or more imaging devices 952. The one or more imaging devices 952 may include various types of raster-based imaging devices such as monitors and printers. In one embodiment, one or more display devices 952 may be coupled to the graphics component 956 for display of data provided by the graphics component 956.

In one embodiment, program instructions 940 that may be executable by the processor(s) 910 to implement aspects of the techniques described herein may be partly or fully resident within the memory 920 at the computer system 900 at any point in time. The memory 920 may be implemented using any appropriate medium such as any of various types of ROM or RAM (e.g., DRAM, SDRAM, RDRAM, SRAM, etc.), or combinations thereof. The program instructions may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. It will be apparent to those having ordinary skill in the art that computer system 900 can also include numerous elements not shown in FIG. 9, as illustrated by the ellipsis shown.

In various embodiments, the operations shown in FIGS. 1 and 3-5 may be performed in a different order than the illustrated order. In general, any of the operations described in these figures may be performed programmatically (i.e., by a computer according to a computer program). In FIGS. 1 and 3-5, any of the operations described may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
   receiving data representing a scene comprising one or more three-dimensional geometric primitives;
   rendering at least one surface into a current depth buffer by performing a depth peel of a surface nearest to a viewer at each pixel;
   compositing values associated with one or more other surfaces into an image buffer for respective pixels without performing depth peeling of the one or more other surfaces;
   compositing values associated with the at least one surface into the image buffer for the pixels; and
   generating an output image representing the scene dependent on the values composited into the image buffer.

2. The method of claim 1,
   wherein the at least one surface is a transparent or semi-transparent surface; and
   wherein said compositing values associated with the at least one surface and said compositing values associated with the one or more other surfaces comprise computing composite transparency values for the pixels in the image buffer.

3. The method of claim 1, further comprising, determining whether the one or more other surfaces are in a correct occlusion order with respect to a viewing direction;
   wherein said compositing values associated with the one or more other surfaces is performed in response to determining that the one or more other surfaces are in a correct occlusion order with respect to a viewing direction.

4. The method of claim 3, wherein said determining comprises determining a nearest out-of-order surface that succeeds the at least one surface.

5. The method of claim 4, wherein said determining the nearest out-of-order surface that succeeds the at least one surface comprises counting a longest coherent span of surfaces that are in occlusion order.

6. The method of claim 1, further comprising, determining whether the at least one surface is in a correct occlusion order with respect to a given surface;
   wherein said rendering at least one surface is performed in response to determining that the at least one surface is not in a correct occlusion order with respect to the given surface.

7. The method of claim 1, further comprising, prior to said rendering at least one surface, performing at least a partial sort of two or more surfaces of the one or more three-dimensional geometric primitives into occlusion order.

8. The method of claim 7, wherein said partial sort results in at least a portion of the two or more surfaces being sequentially ordered by occlusion priority for at least a portion of the image.

9. The method of claim 7,
   wherein said partial sort is performed on a sub-set of the two or more surfaces in a given depth range; and
   wherein said generating an output image comprises generating an intermediate output image dependent only on the sub-set of the two or more surfaces.

10. The method of claim 9, further comprising:
    subsequent to said compositing values associated with the at least one surface, performing a partial sort on a second sub-set of the two or more surfaces in a second depth range; and
    repeating said rendering at least one surface, said compositing values associated with one or more other surfaces, said compositing values associated with the at least one surface, and said generating an output image to generate a second intermediate output image dependent on the sub-set of the two or more surfaces and the second sub-set of the two or more surfaces.

11. The method of claim 1,
    wherein said rendering at least one surface into a current depth buffer comprises determining a nearest out-oforder surface that succeeds the at least one surface by rendering two or more unsorted surfaces into the current depth buffer; and wherein said compositing values associated with the one or more other surfaces comprises compositing values associated with one or more surfaces in a depth range dependent on the nearest out-of-order surface and the at least one surface.

12. The method of claim 11,
wherein the number of surfaces in the depth range is greater than or equal to two; and
wherein said compositing values associated with the one or more surfaces in the depth range is performed in a single operation.

13. The method of claim 1, further comprising, prior to said rendering at least one surface, separating the data representing the scene into data representing transparent surfaces and data representing opaque surfaces;
wherein said rendering at least one surface, said compositing values associated with the one or more other surfaces, and said compositing values associated with the at least one surface are performed for the transparent surfaces; and
wherein the method further comprises combining results of compositing values associated with the opaque surfaces, results of said compositing values associated with the one or more other surfaces, and results of said compositing values associated with the at least one surface into the image buffer prior to said generating an output image.

14. A non-transitory computer-readable storage medium storing program instructions computer-executable to implement: receiving data representing a scene comprising one or more three-dimensional geometric primitives; rendering at least one surface into a current depth buffer by performing a depth peel of a surface nearest to a viewer at each pixel; compositing values associated with one or more other surfaces into an image buffer for respective pixels without performing depth peeling of the one or more other surfaces; compositing values associated with the at least one surface into the image buffer for the pixels; and generating an output image representing the scene dependent on the values composited into the image buffer.

15. The non-transitory computer-readable storage medium of claim 14, wherein the at least one surface is a transparent or semi-transparent surface; and wherein said compositing values associated with the at least one surface and said compositing values associated with the one or more other surfaces comprise computing composite transparency values for the pixels in the image buffer.

16. The non-transitory computer-readable storage medium of claim 14, wherein the program instructions are further computer-executable to implement determining whether the one or more other surfaces are in a correct occlusion order with respect to a viewing direction; wherein said compositing values associated with the one or more other surfaces is performed in response to determining that the one or more other surfaces are in a correct occlusion order with respect to a viewing direction.

17. The non-transitory computer-readable storage medium of claim 16, wherein said determining comprises determining a nearest out-of-order surface that succeeds the at least one surface.

18. The non-transitory computer-readable storage medium of claim 17, wherein said determining the nearest out-of-order surface that succeeds the at least one surface comprises counting a longest coherent span of surfaces that are in occlusion order.

19. The non-transitory computer-readable storage medium of claim 14, wherein the program instructions are further computer-executable to implement determining whether the at least one surface is in a correct occlusion order with respect to a given surface; wherein said rendering at least one surface is performed in response to determining that the at least one surface is not in a correct occlusion order with respect to the given surface.

20. The non-transitory computer-readable storage medium of claim 14, wherein the program instructions are further computer-executable to implement, prior to said rendering at least one surface, performing at least a partial sort of two or more surfaces of the one or more three-dimensional geometric primitives into occlusion order.

21. The non-transitory computer-readable storage medium of claim 20, wherein said partial sort results in at least a portion of the two or more surfaces being sequentially ordered by occlusion priority for at least a portion of the image.

22. The non-transitory computer-readable storage medium of claim 20, wherein said partial sort is performed on a sub-set of the two or more surfaces in a given depth range; and wherein said generating an output image comprises generating an intermediate output image dependent only on the sub-set of the two or more surfaces.

23. The non-transitory computer-readable storage medium of claim 22, wherein the program instructions are further computer-executable to implement: subsequent to said compositing values associated with the at least one surface, performing a partial sort on a second sub-set of the two or more surfaces in a second depth range; and repeating said rendering at least one surface, said compositing values associated with one or more other surfaces, said compositing values associated with the at least one surface, and said generating an output image to generate a second intermediate output image dependent on the sub-set of the two or more surfaces and the second sub-set of the two or more surfaces.

24. The non-transitory computer-readable storage medium of claim 14, wherein said rendering at least one surface into a current depth buffer comprises determining a nearest out-of-order surface that succeeds the at least one surface by rendering two or more unsorted surfaces into the current depth buffer; and wherein said compositing values associated with the one or more other surfaces comprises compositing values associated with one or more surfaces in a depth range dependent on the nearest out-of-order surface and the at least one surface.

25. The non-transitory computer-readable storage medium of claim 24, wherein the number of surfaces in the depth range is greater than or equal to two; and wherein said compositing values associated with the one or more surfaces in the depth range is performed in a single operation.

26. The non-transitory computer-readable storage medium of claim 14, wherein the program instructions are further computer-executable to implement, prior to said rendering at least one surface, separating the data representing the scene into data representing transparent surfaces and data representing opaque surfaces; wherein said rendering at least one surface, said compositing values associated with the one or more other surfaces, and said compositing values associated with the at least one surface are performed for the transparent surfaces; and wherein the program instructions are further computer-executable to implement combining results of compositing values associated with the opaque surfaces, results of said compositing values associated with the one or more other surfaces, and results of said compositing values associated with the at least one surface into the image buffer prior to said generating an output image.

27. A system, comprising:
one or more processors;
a memory coupled to the one or more processors, wherein the memory stores program instructions executable by the one or more processors to implement:
receiving data representing a scene comprising one or more three-dimensional geometric primitives;
rendering at least one surface into a current depth buffer by performing a depth peel of a surface nearest to a viewer at each pixel;
compositing values associated with one or more other surfaces into an image buffer for respective pixels without performing depth peeling of the one or more other surfaces;
compositing values associated with the at least one surface into the image buffer for the pixels; and
generating an output image representing the scene dependent on the values composited into the image buffer.

28. The system of claim 27,
wherein the at least one surface is a transparent or semi-transparent surface; and
wherein said compositing values associated with the at least one surface and said compositing values associated with the one or more other surfaces comprise computing composite transparency values for the pixels in the image buffer.

29. The system of claim 27, wherein the program instructions are further computer-executable to implement determining whether the one or more other surfaces are in a correct occlusion order with respect to a viewing direction;
wherein said compositing values associated with the one or more other surfaces is performed in response to determining that the one or more other surfaces are in a correct occlusion order with respect to a viewing direction.

30. The system of claim 29, wherein said determining comprises determining a nearest out-of-order surface that succeeds the at least one surface.

31. The system of claim 30, wherein said determining the nearest out-of-order surface that succeeds the at least one surface comprises counting a longest coherent span of surfaces that are in occlusion order.

32. The system of claim 27, wherein the program instructions are further computer-executable to implement determining whether the at least one surface is in a correct occlusion order with respect to a given surface;
wherein said rendering at least one surface is performed in response to determining that the at least one surface is not in a correct occlusion order with respect to the given surface.

33. The system of claim 27, wherein the program instructions are further computer-executable to implement, prior to said rendering at least one surface, performing at least a partial sort of two or more surfaces of the one or more three-dimensional geometric primitives into occlusion order.

34. The system of claim 33, wherein said partial sort results in at least a portion of the two or more surfaces being sequentially ordered by occlusion priority for at least a portion of the image.

35. The system of claim 33,
wherein said partial sort is performed on a sub-set of the two or more surfaces in a given depth range; and
wherein said generating an output image comprises generating an intermediate output image dependent only on the sub-set of the two or more surfaces.

36. The system of claim 35, wherein the program instructions are further computer-executable to implement:
subsequent to said compositing values associated with the at least one surface, performing a partial sort on a second sub-set of the two or more surfaces in a second depth range; and
repeating said rendering at least one surface, said compositing values associated with one or more other surfaces, said compositing values associated with the at least one surface, and said generating an output image to generate a second intermediate output image dependent on the sub-set of the two or more surfaces and the second sub-set of the two or more surfaces.

37. The system of claim 27,
wherein said rendering at least one surface into a current depth buffer comprises determining a nearest out-of-order surface that succeeds the at least one surface by rendering two or more unsorted surfaces into the current depth buffer; and
wherein said compositing values associated with the one or more other surfaces comprises compositing values associated with one or more surfaces in a depth range dependent on the nearest out-of-order surface and the at least one surface.

38. The system of claim 37,
wherein the number of surfaces in the depth range is greater than or equal to two; and
wherein said compositing values associated with the one or more surfaces in the depth range is performed in a single operation.

39. The system of claim 27, wherein the program instructions are further computer-executable to implement, prior to said rendering at least one surface, separating the data representing the scene into data representing transparent surfaces and data representing opaque surfaces;
wherein said rendering at least one surface, said compositing values associated with the one or more other surfaces, and said compositing values associated with the at least one surface are performed for the transparent surfaces; and
wherein the program instructions are further computer-executable to implement combining results of compositing values associated with the opaque surfaces, results of said compositing values associated with the one or more other surfaces, and results of said compositing values associated with the at least one surface into the image buffer prior to said generating an output image.

40. The system of claim 27, wherein the one or more processors comprises at least one a graphics processing unit (GPU).

* * * * *